(12) United States Patent
Ohtake

(10) Patent No.: US 7,692,870 B2
(45) Date of Patent: Apr. 6, 2010

(54) ZOOM LENS AND IMAGING APPARATUS

(75) Inventor: Motoyuki Ohtake, Saitama (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 12/216,950

(22) Filed: Jul. 14, 2008

(65) Prior Publication Data

US 2009/0046374 A1 Feb. 19, 2009

(30) Foreign Application Priority Data

Aug. 15, 2007 (JP) ............................. 2007-211928

(51) Int. Cl.
*G02B 15/14* (2006.01)
(52) U.S. Cl. ..................... 359/684; 359/676; 359/683
(58) Field of Classification Search .................. 359/676, 359/683, 684, 705
See application file for complete search history.

(56) References Cited

U.S. PATENT DOCUMENTS

| 7,446,804 B2 * | 11/2008 | Nanjo ..................... 348/240.3 |
| 7,609,446 B2 * | 10/2009 | Nanba ......................... 359/557 |
| 2009/0046199 A1 * | 2/2009 | Nanjo ........................ 348/347 |

FOREIGN PATENT DOCUMENTS

| JP | 2003-287681 | 10/2003 |
| JP | 2005-181635 | 7/2005 |
| JP | 2005-215165 | 8/2005 |
| JP | 2005-215385 | 8/2005 |
| JP | 2007-003554 | 1/2007 |

* cited by examiner

*Primary Examiner*—David N Spector
(74) *Attorney, Agent, or Firm*—Rader, Fishman & Grauer PLLC

(57) ABSTRACT

A zoom lens and an imaging apparatus are disclosed. The zoom lens includes, in order from an object side to an image-plane side, a first lens group having a positive refractive power, a second lens group having a negative refractive power, a third lens group having a positive refractive power, a fourth lens group having a negative refractive power, and a fifth lens group having a positive refractive power. During a change of a lens zoom position from a maximum wide angle state to a maximum telephoto state, at least the second lens group moves toward an image side, the third lens group moves toward an object side, and the fourth lens group is fixed in an optical-axis direction. An aperture stop is disposed near the object side of the third lens group. The first to fifth lens groups satisfy predetermined conditions.

8 Claims, 27 Drawing Sheets

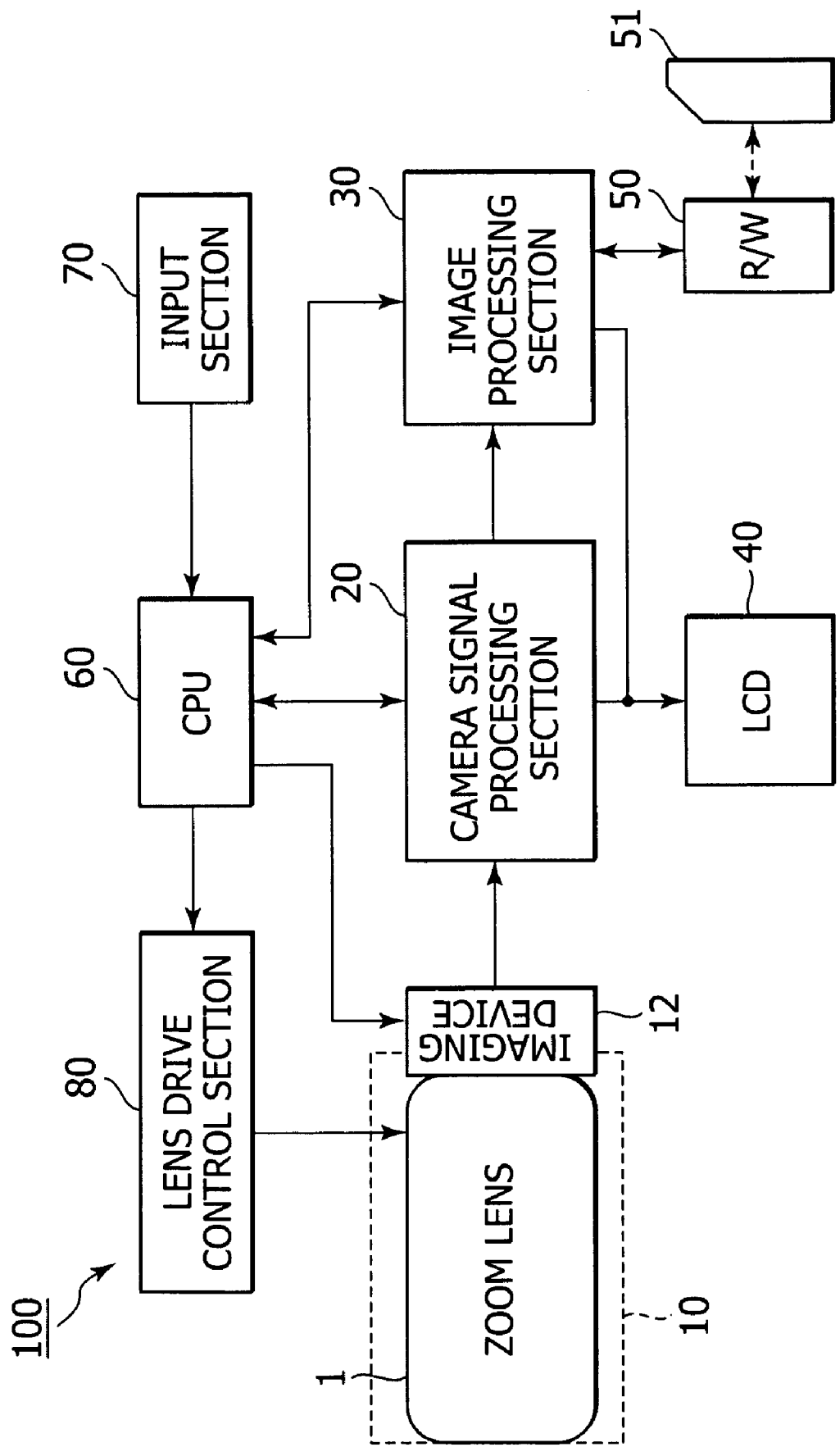

ZOOM LENS AND IMAGING APPARATUS

CROSS-REFERENCE TO RELATED APPLICATIONS

The present application claims benefit of priority of Japanese patent Application No. 2007-211928 filed in the Japanese Patent Office on Aug. 15, 2007, the entire disclosure of which is incorporated herein by reference.

BACKGROUND OF THE INVENTION

1. Field of the Invention

The present invention relates to a zoom lens and an imaging apparatus. More particularly, the invention relates to a small-sized and high-performance zoom lens having a high zooming ratio, and an imaging apparatus using the zoom lens.

2. Description of Related Art

Digital cameras have been popular, which adopt the following recording system. Namely, the recording system employs, as recording means in the cameras, an imaging device using photoelectric conversion elements, such as a CCD (Charge Coupled Device) or a CMOS (Complementary Metal-Oxide Semiconductor). The imaging device forms an object image on a surface thereof, and records the object image by causing the photoelectric conversion elements to convert amounts of light of the object image into electrical outputs, respectively.

Recently, in lens-incorporated cameras, there is a growing demand, among many users, for zoom lenses having a higher zooming ratio.

This is because, unlike a single-lens reflex camera, lenses cannot be interchanged in a lens-incorporated camera, so that if the zooming ratio is low, it is difficult to accommodate various photographic scenes.

Zoom lenses realizing a high zooming ratio have been proposed, e.g., in Japanese Unexamined Patent Application Publication No. 2003-287681 (Patent Document 1), Japanese Unexamined Patent Application Publication No. 2005-215385 (Patent Document 2), and Japanese Unexamined Patent Application Publication No. 2007-3554 (Patent Document 3).

A zoom lens described in the Patent Document 1 is constructed by arranging, in the order from an object side, a first lens group having a positive refractive power, a second lens group having a negative refractive power, a third lens group having a positive refractive power, a fourth lens group having a negative refractive power, and a fifth lens group having a positive refractive power. In embodiments thereof, zoom lenses having a zooming ratio of about 10 times are disclosed.

A zoom lens described in the Patent Document 2 is constructed by arranging, in the order from an object side, a first lens group having a positive refractive power, a second lens group having a negative refractive power, a third lens group having a positive refractive power, and a fourth lens group having a positive refractive power. In embodiments thereof, zoom lenses having a zooming ratio of about 12 times are disclosed.

A zoom lens described in the Patent Document 3 is constructed by arranging, in the order from an object side, a first lens group having a positive refractive power, a second lens group having a negative refractive power, a third lens group having a positive refractive power, a fourth lens group having a positive refractive power, and a fifth lens group having a positive refractive power. In embodiments thereof, zoom lenses having a zooming ratio of some 20 times are disclosed.

SUMMARY OF THE INVENTION

However, it has been difficult for earlier developed zoom lenses to meet all of higher zooming power, higher image quality, and miniaturization.

In the zoom lens described in the Patent Document 1, the presence of too many movable lens groups complicates a lens-barrel structure, thereby hindering miniaturization.

In the zoom lens described in the Patent Document 2, the higher-zooming-ratio requirement may be met to some extent, but is difficult to achieve compatibly with miniaturization.

In the zoom lens described in the Patent Document 3, one method is disclosed for achieving a high zooming ratio exceeding 20 times. However, there are also issues that the total lens length is large, and that the moving stroke of the fourth lens group moving during close-distance focusing is so large that this zoom lens is unsuitable for autofocusing operation.

Accordingly, it is desirable to provide a zoom lens capable of achieving all of a higher zooming ratio exceeding 20 times, higher performance, and miniaturization, and an imaging apparatus using the zoom lens.

In accordance with one embodiment of the present invention, a zoom lens is provided which includes: in the order from an object side to an image-plane side, a first lens group having a positive refractive power, a second lens group having a negative refractive power, a third lens group having a positive refractive power, a fourth lens group having a negative refractive power, and a fifth lens group having a positive refractive power. During a change of a lens zoom position from a maximum wide angle state to a maximum telephoto state, at least the second lens group moves toward an image side, the third lens group moves toward the object side, and the fourth lens group is fixed in an optical-axis direction. An aperture stop is disposed near the object side of the third lens group. The following conditional expressions (1) and (2) are satisfied:

$$0.05 < f2/f4 < 0.3, \text{ and} \tag{1}$$

$$0.1 < \Delta 3/ft < 0.2, \tag{2}$$

where f2 is a focal length of the second lens group, f4 is a focal length of the fourth lens group, $\Delta 3$ is an amount of movement of the third lens group during the change of the lens zoom position from the maximum wide angle state to the maximum telephoto state, and ft is a focal length of a whole lens system at the maximum telephoto state.

In accordance another embodiment of the present invention, an imaging-apparatus is provided which includes the above-mentioned zoom lens and an imaging device for converting an optical image formed by the zoom lens into an electrical signal.

According to embodiments of the present invention, all of the high zooming ratio exceeding 20 times, higher performance, and miniaturization may be achieved.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 27 is a circuit block diagram of an embodiment in which an imaging apparatus according to an embodiment of the present invention is applied to a digital still camera.

DETAILED DESCRIPTION OF EMBODIMENTS

Figure 1:
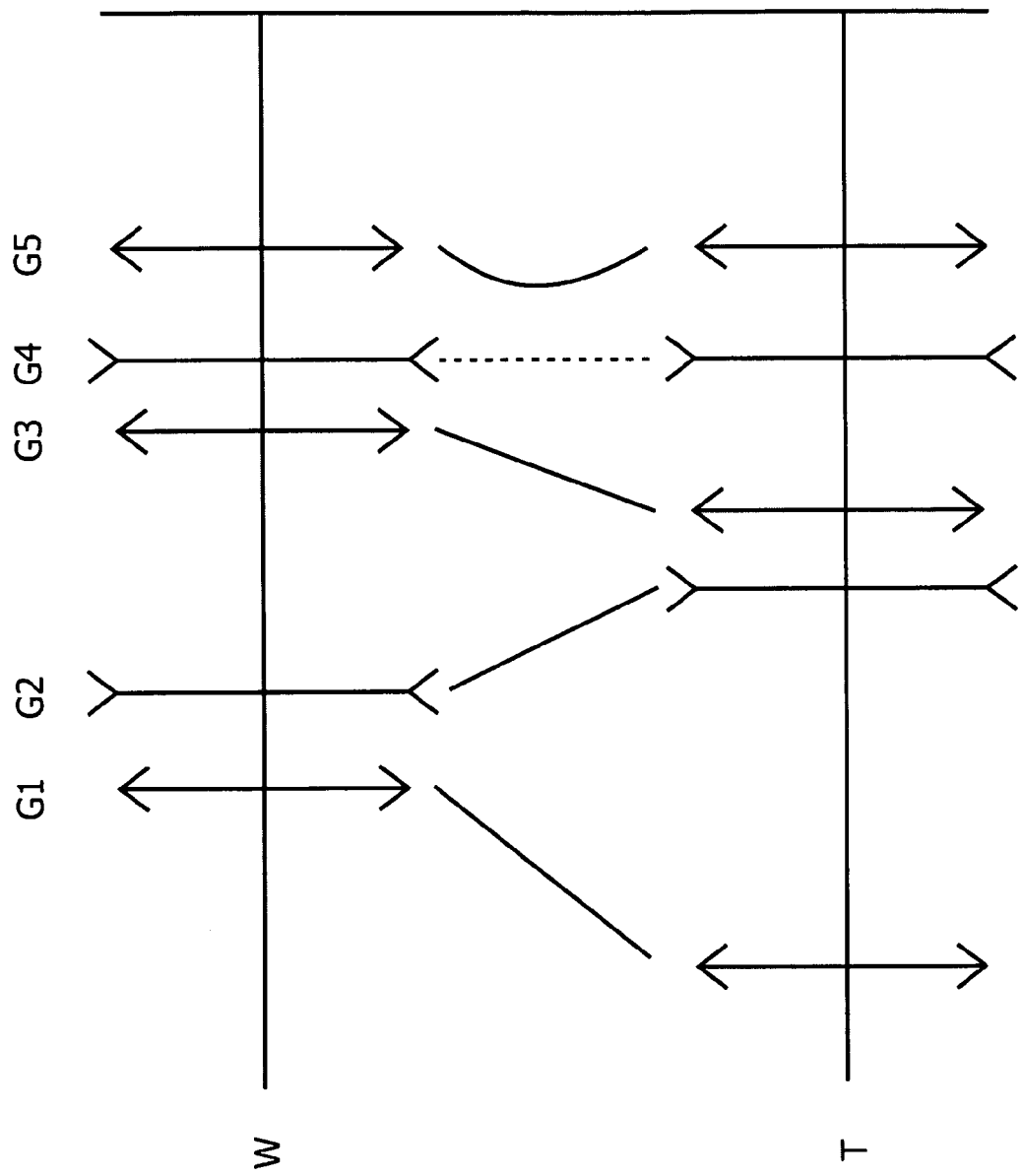
FIG. 1 is a diagram illustrating a refractive power arrangement of a zoom lens according to an embodiment of the present invention.

Embodiments of a zoom lens and an imaging apparatus according to an embodiment of the present invention will be described below.

The zoom lens according to an embodiment of the present invention includes, in the order from an object side to an image-plane side, a first lens group having a positive refractive power, a second lens group having a negative refractive power, a third lens group having a positive refractive power, a fourth lens group having a negative refractive power, and a fifth lens group having a positive refractive power. During change of a lens zoom position from a maximum wide angle state to a maximum telephoto state, at least the second lens group moves toward an image side, the third lens group moves toward the object side, and the fourth lens group is fixed in an optical-axis direction. An aperture stop is disposed near the object side of the third lens group. The following conditional expressions (1) and (2) are satisfied:

$$0.05 < f2/f4 < 0.3, \text{ and} \quad (1)$$

$$0.1 < \Delta 3/ft < 0.2, \quad (2)$$

where f2 is the focal length of the second lens group, f4 is the focal length of the fourth lens group, $\Delta 3$ is the amount of movement of the third lens group during change of the lens zoom position from the maximum wide angle state to the maximum telephoto state, and ft is the focal length of a whole lens system at the maximum telephoto state.

The zoom lens according to an embodiment of the present invention has a zooming configuration including, in the order from the object side to the image-plane side, the first lens group having a positive refractive power, the second lens group having a negative refractive power, the third lens group having a positive refractive power, the fourth lens group having a negative refractive power, and the fifth lens group having a positive refractive power.

In lens-incorporated cameras, a positive-negative-positive-positive four-group zoom lens or a positive-negative-positive-positive-positive five-group zoom lens has been often used. However, since the lens system has only one negative lens group and it is the second lens group having negative refractive power that is mainly responsible for zooming operation, it has been an issue to suppress various aberrations occurring in the second lens group.

In order to accomplish miniaturization and a high zooming ratio, it is easy way to increase the refractive power of each lens group. However, such an easy way would make it difficult to satisfactorily correct fluctuations of off-axis aberrations occurring in the second lens group alone during change of the lens zoom position. As a result, the refractive power of the second lens group cannot be increased, and thus miniaturization has not been accomplished adequately.

To overcome this situation, the zoom lens according to an embodiment of the present invention implements the fourth lens group having a negative refractive power, thereby making a refractive power arrangement in the whole lens system more axially symmetrical to reduce the burden of aberration correction born by the second lens group.

Generally, if the number of movable lens groups constituting a lens system is increased, there will be more zooming locus options, and thus fluctuations of various aberrations occurring when the zooming ratio is increased can be corrected satisfactorily. This, however, invites another issue that the number of driving mechanisms is increased to complicate a lens-barrel structure. Even if the lens system is down-sized, when the lens-barrel structure is complicated and thus upsized, a camera body will also be upsized and its portability will be sacrificed.

In the zoom lens according to an embodiment of the present invention, by fixing the fourth lens group in the optical-axis direction during zooming, enhanced zooming and miniaturization can be compatibly achieved without complicating the lens-barrel structure. A negative lens group may be disposed at the most-imagewise position. However, when the negative lens group is fixed in the optical-axis direction, the lateral magnification of the negative lens group is fixed, regardless of the lens zoom position from the maximum wide angle state to the maximum telephoto state, thereby not contributing to the zooming operation. On the other hand, when the negative lens group is moved toward the object side for contribution to zooming, it is not preferable in that the total lens length at the maximum telephoto state increases. At the same time, it also complicates the lens-barrel structure due to the increase of the number of driving mechanisms.

In the zoom lens according to an embodiment of the present invention, at least the second lens group moves toward the image side, the third lens group moves toward the object side, and the fourth lens group is fixed in the optical-axis direction such that a distance between the first lens group and the second lens group increases, a distance between the second lens group and the third lens group decreases, and a distance between the third lens group and the fourth lens group increases, during change of the lens zoom position from the maximum wide angle state to the maximum telephoto state. In addition, the aperture stop is disposed near the object side of the third lens group.

By moving the respective lens groups in the above way during the change of the lens zoom position, the fluctuations of the off-axis aberrations can be corrected satisfactorily.

Specifically, by narrowing the distance between the first lens group and the second lens group at the maximum wide angle state, an off-axis pencil of light passing through the first lens group gets near an optical axis, thereby suppressing comatic aberrations occurring at the periphery of a screen. Furthermore, by widening a distance between the second lens group and the aperture stop, an off-axis pencil of light passing through the second lens group moves away from the optical axis, so that fluctuations in comatic aberration due to change of an angle of view can be corrected satisfactorily.

By widening the distance between the first lens group and the second lens group during the change of the lens zoom position from the maximum wide angle state to the maximum telephoto state, the off-axis pencil of light passing through the first lens group moves away from the optical axis, so that fluctuations of off-axis aberrations occurring during the change of the lens zoom position can be corrected satisfactorily. Furthermore, by narrowing the distance between the second lens group and the third lens group and also by decreasing the distance between the second lens group and the aperture stop, the off-axis pencil of light passing through the second lens group gets near the optical axis, thereby suppressing the fluctuations of the off-axis aberrations occurring during the change of the lens zoom position more satisfactorily.

Furthermore, by moving the third lens group toward the object side during the change of the lens zoom position from the maximum wide angle state to the maximum telephoto state, the lateral magnification of the third lens group varies positively. Namely, the third lens group contributes to the zooming operation.

If the amount of movement of the third lens group becomes excessively large, the first lens group and the second lens group need be moved toward the object side, thereby upsizing the total lens length. Thus, it is desirable to suitably set the amount of movement of the third lens group (see the above-mentioned conditional expression (2)).

The conditional expression (1) is intended to define a focal length ratio of the second lens group to the fourth lens group, and thus defines a condition for compatibly realizing miniaturization and higher performance.

If f2/f4 falls below the lower limit of the conditional expression (1), the refractive power of the second lens group increases and the refractive power of the fourth lens group decreases, thereby reducing the effect of the fourth lens group on aberration correction, and hence making it difficult to correct the fluctuations of the off-axis aberrations associated with change of the lens zoom position.

If f2/f4 exceeds the upper limit of the conditional expression (1), the refractive power of the second lens group decreases and the refractive power of the fourth lens group increases, so that the distance between the first lens group and the second lens group at the maximum telephoto state need be widened, thereby increasing the total lens length. At the same time, diverging operation by the fourth lens group increases, thereby further increasing the total lens length.

It is noted that in the zoom lens according to the embodiment of the present invention, it is desirable to set the upper limit of the conditional expression (1) to 0.25 in order to suppress reduction of its optical performance due to mutual eccentricity of the third lens group and the fourth lens group as well as reduction of its optical performance due to mutual eccentricity of the fourth lens group and the fifth lens group, both occurring during manufacture, and hence to minimize the influence of manufacturing error and to ensure stable optical quality.

In the zoom lens according to the embodiment of the present invention, it is required that the conditional expression (2) be satisfied in order to satisfactorily correct fluctuations of off-axis aberrations associated with change of the angle of view at the maximum wide angle state.

The conditional expression (2) is intended to define the zooming operation of the third lens group.

Letting a zooming ratio Z be (Z=ft/fw), the denominator ft equals ft=fw·Z. Accordingly, $\Delta 3$/ft in the conditional expression (2) can be denoted $\Delta 3$/(Z·fw). Hence, the conditional expression (2) defines the amount of movement of the third lens group with respect to the zooming ratio.

If Δ3/ft falls below the lower limit of the conditional expression (2), change of the lateral magnification of the second lens group associated with change of the lens zoom position increases. Thus, if one tries to leave the lens diameter unchanged, the refractive power of the second lens group increases, thereby making it difficult to satisfactorily correct the fluctuations of the off-axis aberrations associated with change of the angle of view at the maximum wide angle state.

Conversely, if Δ3/ft exceeds the upper limit of the conditional expression (2), the amount of movement of the third lens group increases, i.e., change of the lateral magnification of the third lens group becomes too large, thereby making it difficult to satisfactorily correct fluctuations of off-axis aberrations associated with change of the lens zoom position occurring in the third lens group.

In the zoom lens according to the one embodiment of the present invention, in order to achieve further miniaturization and higher performance, it is desirable that the following conditional expression (3) be satisfied:

$$0.15 < D4/TL < 0.3, \qquad (3)$$

where D4 is the distance from a most-imagewise surface of the fourth lens group to an image-plane, and TL is the total lens length at the maximum telephoto state.

The conditional expression (3) is intended to define the position of the fourth lens group.

If D4/TL exceeds the upper limit of the conditional expression (3), the fourth lens group moves away from the image side, thereby upsizing the total lens length.

If D4/TL falls below the lower limit of the conditional expression (3), the fourth lens group gets near the image plane, and hence the moving stroke of the fifth lens group need be decreased. This increases the refractive powers of the fourth lens group and the fifth lens group, thereby making it difficult to satisfactorily correct off-axis aberrations occurring during the change of the lens zoom position, so that further higher performance cannot be achieved.

In the zoom lens according to the one embodiment of the present invention, it is desirable that the fifth lens group move in the optical-axis direction during the close-distance focusing and also the following conditional expression (4) be satisfied:

$$-0.1 < \beta 5t < 0.6, \qquad (4)$$

where β5t is the lateral magnification of the fifth lens group at the maximum telephoto state.

Generally, when an object image is recorded using an imaging device, the exit pupil position of an optical system moves away from an image plane, i.e., principal rays exiting from the optical system are approximately parallel to the optical axis. As such, when a so-called rear-focusing system, which drives a lens group disposed at the most-imagewise position of the optical system in the optical axis, is used, the change in the height of an off-axis pencil of light passing through the lens group is small at the time of moving of the lens system in the optical axis. As a result, the close-distance focusing can be performed in a state of less fluctuation of various aberrations.

An embodiment of the present invention performs the close-distance focusing as well, and thus the close-distance focusing can be conducted in a state of less fluctuation of various aberrations associated with change of an object distance when the fifth lens group is moved in the optical-axis direction.

The conditional expression (4) provides in order to define the lateral magnification of the fifth lens group, and also to decrease a moving stroke necessary for close-distance focusing.

If β5t exceeds the upper limit of the conditional expression (4), the moving stroke necessary for close-distance focusing at the maximum telephoto state increases, thereby increasing the load of the driving mechanism. As a result, this does not sufficiently contribute to power saving.

Conversely, if β5t falls below the lower limit of the conditional expression (4), a pencil of light exiting from the fourth lens group enters the fifth lens group as diverged, thereby causing an increase in the total lens length.

It is desirable that the fifth lens group ensures the close-distance focusing and also compensates for fluctuations of an image-plane position associated with movement of the respective lens groups. This is because the following feature of the fifth lens group can be utilized. Namely, the fifth lens group has a positive refractive power and is disposed at the most-imagewise position. As a result, even if the fifth lens group moves in the optical-axis direction, the height of an off-axis pencil of light passing through the fifth lens group does not change so extremely. As a result of this feature, even if the fifth lens group moves in the optical-axis direction, the fifth lens group, due to off-axis aberrations fluctuating less, is suitable for compensating for the image-plane position.

In the zoom lens according to an embodiment of the present invention, it is desirable that the fifth lens group move in the optical-axis direction during the close-distance focusing, the conditional expression (4) be satisfied, and also the following conditional expression (5) be satisfied:

$$0.25 < \beta 2w \cdot \beta 2t < 0.8, \qquad (5)$$

where β2w is the lateral magnification of the second lens group at the maximum wide angle state, and β2t is the lateral magnification of the second lens group at the maximum telephoto state.

As a result, miniaturization and higher performance can be achieved.

The conditional expression (5) provides to define the lateral magnification of the second lens group.

In order to reduce the total lens length, it is effective to decrease the moving stroke of the fifth lens group. This is because in order to fix the fourth lens group in the optical-axis direction, space for the moving stroke of the fifth lens group is required at the image side of the fourth lens group.

The moving stroke of the fifth lens group is represented by a sum of (A) an amount of compensating movement and (B) an amount of focusing movement. The (A) the amount of compensating movement means an amount of movement (when an object position is at infinity) required to compensate for the image-plane position, and the (B) the amount of focusing movement means an amount of movement required to keep the image-plane position fixed during the change of the object position.

Thus, in order to decrease the moving stroke of the fifth lens group, it is required to (a) decrease a difference between a position at the maximum wide angle state and a position at the maximum telephoto state of the fifth lens group with respect to an infinity object, and (b) decrease the amount of focusing movement at the maximum telephoto state. The requirement (b) can be achieved by satisfying the conditional expression (4). The conditional expression (5) corresponds to the requirement (a).

In this embodiment, the lateral magnification of the second lens group becomes greater than −1 at the maximum wide angle state and smaller than −1 at the maximum telephoto state. As a result, during the change of the lens zoom position from the maximum wide angle state to the maximum telephoto state, the fifth lens group follows a moving locus in which the fifth lens group first moves toward the object side, then turns its direction to move toward the image side since a position at which the magnification of the second lens group equals 1× (i.e., −1) is included. As a result, the moving stroke can be decreased, compared to a case where the fifth lens group moves in a single direction.

If β2w·β2t falls below the lower limit of the conditional expression (5), the lateral magnification of the second lens group at the maximum telephoto state becomes small, thereby moving the position of the fifth lens group at the maximum telephoto state toward the object side. As a result, the amount of compensating movement is increased, thereby preventing sufficient reduction of the total lens length.

If β2w·β2t exceeds the upper limit of the conditional expression (5), the lateral magnification of the second lens group at the maximum telephoto state becomes large. This causes an off-axis pencil of light passing through the first lens group at the maximum telephoto state to move away from the optical axis, thereby preventing sufficient reduction of the lens diameter.

In the zoom lens according to an embodiment of the present invention, it is desirable that the fifth lens group move in the optical-axis direction during the close-distance focusing, the conditional expressions (4) and (5) be satisfied, and also the following conditional expression (6) be satisfied:

$$0.3 < |f4|/ft < 1.5. \tag{5}$$

The conditional expression (6) provides to define the focal length of the fourth lens group.

If |f4|/ft exceeds the upper limit of the conditional expression (6), the refractive power of the fourth lens group decreases, thereby preventing the negative refractive power of the second lens group from increasing in order to satisfactorily correct negative distortions occurring at the maximum wide angle state. As a result, the distance between the first lens group and the second lens group need to be increased at the maximum telephoto state, thereby making it difficult to reduce the total lens length.

Conversely, if |f4|/ft falls below the lower limit of the conditional expression (6), the refractive power of the fourth lens group increases, thereby excessively increasing the total lens length at the maximum telephoto state, and thus preventing the miniaturization requirement from being sufficiently met.

In the zoom lens according to an embodiment of the present invention, in order to satisfactorily correct a negative spherical aberration occurring at the maximum telephoto state, it is desirable that the first lens group be constructed of a cemented lens component formed of a meniscus-shaped negative lens having a concave surface facing the image side and a positive lens having a convex surface facing the object side, and one or more positive lens components disposed on the image side of the cemented lens component, and that the following expressions (7) and (8) be satisfied:

$$-0.15 < f1/f1a < 0.4, \text{ and} \tag{7}$$

$$vd1P > 70, \tag{8}$$

where f1a is the focal length of the cemented lens component disposed in the first lens group, f1 is the focal length of the first lens group, and vd1P is the Abbe number of the positive lens in the cemented lens component disposed in the first lens group.

In order to satisfactorily the correct chromatic aberration and the negative spherical aberration occurring in the first lens group alone, it is preferable to clarify functions of the cemented lens component and the positive lens component constituting the first lens group.

In the zoom lens according to the present embodiment, miniaturization and higher performance can be compatibly provided by an aberration correcting function by which the cemented lens component corrects mainly the on-axis chromatic aberration and the negative spherical aberration, and by a converging function by which the positive lens component converges a pencil of light.

The conditional expression (7) provides to clarify the functions. If f1/f1a exceeds the upper limit of the conditional expression (7), the on-axis chromatic aberration cannot be sufficiently corrected by the cemented lens component. Conversely, if f1/f1a falls below the lower limit of the conditional expression (7), it is difficult to correct the negative spherical aberration occurring from the positive lens component by the cemented lens.

Furthermore, in order to satisfactorily correct the on-axis chromatic aberration occurring at the maximum telephoto state, it is desirable that the positive lens constituting the cemented lens component is made of a low-divergent glass material satisfying the conditional expression (8). If vd1P falls below the lower limit of the conditional expression (8), it is difficult to correct satisfactorily the on-axis chromatic aberration occurring at the maximum telephoto state.

In the zoom lens according to an embodiment of the present invention, it is desirable that the second lens group be constructed by positioning, in the order from the object side to the image-plane side, a meniscus-shaped first negative lens component having a concave surface facing the image side, a biconvex second negative lens component, and a meniscus-shaped positive lens component having a convex surface facing the object side, and that the following conditional expressions (9) and (10) is satisfied:

$$1.7 < n2a, \text{ and} \tag{9}$$

$$3.5 < (r2d + r3e)/fw < 12, \tag{10}$$

where n2a is the refractive index, with respect to d-line (wavelength=587.6 nm), of the first negative lens component, r2d is the curvature radius of the image-plane-side lens surface of the second negative lens component, and r2e is the curvature radius of the object-side lens surface of the positive lens component.

In this embodiment, by clarifying the role of each lens for aberration correction, various aberrations occurring in the second lens group alone can be satisfactorily corrected, thereby achieving a higher zooming ratio and higher optical performance. Specifically, the first negative lens component corrects the off-axis aberration occurring at the maximum wide angle state, and the second negative lens component and the positive lens component satisfactorily correct the on-axis aberration.

If n2a falls below the lower limit of the conditional expression (9), it is difficult to correct the off-axis aberration sufficiently, thereby making it difficult to achieve further higher performance.

If (r2d+r3e)/fw falls below the lower limit of the conditional expression (10), the optical performance is largely impaired due to mutual eccentricity of the second negative lens component and the positive lens component, thereby aggravating performance degradation due to assembling error during manufacture.

If (r2d+r3e)/fw exceeds the upper limit of the conditional expression (10), the off-axis pencil of light passing through the first lens group moves away from the optical axis, thereby preventing the achievement of sufficient high-performance.

In the zoom lens according to an embodiment of the present invention, it is desirable that the fifth lens group be constructed of at least a single positive lens and a single negative lens. Through a doublet configuration, the off-axis aberration and the on-axis aberration can be corrected simultaneously, and thus fluctuations of various aberrations occurring during the change of the object position may be corrected satisfactorily.

In the zoom lens according to an embodiment of the present invention, by using an aspherical lens, higher optical performance can be achieved. Particularly, by using an aspherical surface in the third lens group, center area optical performance can be further enhanced. Furthermore, by using an aspherical lens in the second lens group, fluctuations of angle-of-view-caused comatic aberrations occurring at the maximum wide angle state may be corrected satisfactorily.

Furthermore, the use of a plurality of aspherical surfaces in a single optical system provides the higher optical performance.

In the zoom lens according to an embodiment of the present invention, by shifting a single lens group or some lenses in a single lens group among lenses constituting a lens system, in a direction approximately perpendicular to the optical axis, an image may be shifted.

The smaller the diameter of a shifting lens in a lens group, the more power-saving and smaller a driving mechanism for driving the shifting lens can be achieved. Thus, it is desirable to shift any of the third lens group and the fourth lens group, or a part of lenses in that lens group in the direction approximately perpendicular to the optical axis.

Since the third lens group is positioned near the aperture stop, the off-axis pencil of light passes near the optical axis. Thus, the off-axis aberration caused when the third lens group is shifted occurs less, thereby facilitating achievement of higher performance.

The fourth lens group is fixed in the optical-axis direction, and thus is suitable as a shifting lens group. This is because the driving mechanisms for shifting lenses are fixed in the optical-axis direction, and thus the lens-barrel structure is easily simplified.

Furthermore, it may be acceptable to dispose a low-pass filter in order to prevent occurrence of moire stripes on the image side of the lens system, and to dispose an infrared cut filter according to the spectroscopic sensitivity of light-receiving elements.

Next, specific embodiments of the zoom lens and numerical examples in which specific values are applied to the embodiments will be described with reference to the drawings and tables.

It is noted that aspherical surfaces are implemented to the embodiments, and that the shape of each aspherical surface is supposed to be defined by the following expression 1.

$$x = cy^2/(1+(1-(1+\kappa)c^2y^2)^{1/2}) + Ay^4 + By^6 + \ldots$$ [Expression 1]

In the expression 1, y is the height from the optical axis, x is the amount of sag, c is the curvature radius, κ is the cone constant, and A, B, . . . are aspherical coefficients.

FIG. 1 shows a refractive power distribution in zoom lenses according to first to fifth embodiments of the present invention. In FIG. 1, each of the zoom lenses includes, in the order from an object side to an image-plane side, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. During zooming from a maximum wide angle state to a maximum telephoto state, the fourth lens group G4 is fixed in an optical-axis direction, the second lens group G2 moves toward an image side, the third lens group G3 moves toward the object side, the fifth lens group G5 first moves toward the object side and then moves toward the image side. The moving locus of the first lens group G1 may be selected freely, and thus the first lens group G1 may also be fixed.

Figure 2:
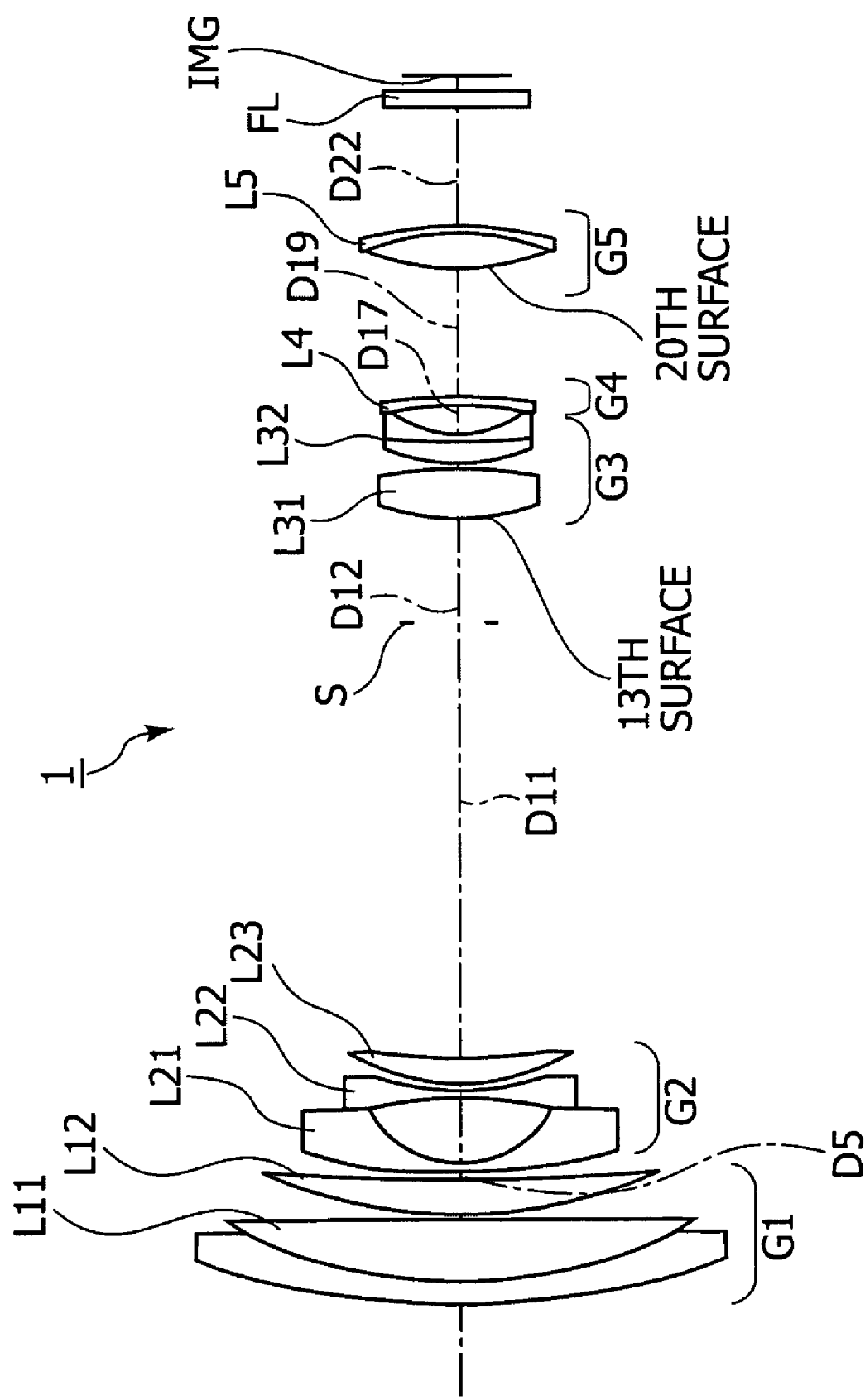
FIG. 2 is a diagram showing the lens construction of a zoom lens according to a first embodiment of the present invention.

FIG. 2 is a diagram showing the lens construction of a zoom lens 1 according to a first embodiment of the present invention. A first lens group G1 is constructed by positioning, in the order from the object side to the image-plane side, a cemented lens L11 formed of a meniscus-shaped negative lens having a convex surface facing the object side and a positive lens having a convex surface facing the object side, and a positive lens L12 having a convex surface facing the object side. A second lens group G2 is constructed by positioning, in the order from the object side to the image-plane side, a meniscus-shaped negative lens L21 having a concave surface facing the image side, a biconcave negative lens L22, and a positive lens L23 having a convex surface facing the object side. A third lens group G3 is constructed by positioning, in the order from the object side to the image-plane side, a biconvex positive lens L31 having a convex surface facing the object side and having the object-side surface formed of an aspherical surface, and a cemented negative lens L32 formed of a positive lens having a convex surface facing the object side and a negative lens having a concave surface facing the image side. A fourth lens group G4 is constructed of a meniscus-shaped negative lens L4 having a concave surface facing the object side. A fifth lens group G5 is constructed of a cemented positive lens L5 formed by positioning, in the order from the object side to the image-plane side, a biconvex positive lens having an object-side surface formed of an aspherical surface, and a meniscus-shaped negative lens having a concave surface facing the object side.

An aperture stop S is disposed on the object side of the third lens group G3, and moves along a locus independent of the third lens group G3 during the change of lens zoom position.

Furthermore, a filter FL such as a low-pass filter is disposed between the fifth lens group G5 and an image plane IMG.

Table 1 shows the lens data of a first numerical example in which specific values are applied to the zoom lens 1. In Table 1 and other lens-data tables, "SURFACE NUMBER" is indicated 1, 2, . . . as sequentially counted from the object side, "CURVATURE RADIUS" denotes the curvature radius of an i-th lens surface counted from the object side, "SURFACE DISTANCE" denotes the axial surface distance between the i-th surface and an (i+1)-th surface, "REFRACTIVE INDEX" denotes the refractive index, with respect to d-line, of the i-th surface counted from the object side, and "ABBE NUMBER" denotes the Abbe number, with respect to d-line, in the i-th surface counted from the object side. Furthermore, "0.000" for a curvature radius "ri" indicates that the surface is a plane surface, and "Di" for an axial surface distance indicates that the surface distance is variable.

TABLE 1

| SURFACE NUMBER | CURVATURE RADIUS | SURFACE DISTANCE | REFRACTIVE INDEX | ABBE NUMBER | |
|---|---|---|---|---|---|
| 1: | 11.555 | 0.317 | 1.90366 | 31.1 | |
| 2: | 6.692 | 0.933 | 1.49700 | 81.6 | |
| 3: | −786.073 | 0.037 | | | |
| 4: | 6.578 | 0.528 | 1.60300 | 65.5 | |
| 5: | 28.615 | (D5) | | | |
| 6: | 8.394 | 0.131 | 1.75500 | 52.3 | |
| 7: | 1.493 | 0.961 | | | |
| 8: | −5.924 | 0.112 | 1.77250 | 49.6 | |
| 9: | 4.435 | 0.088 | | | |
| 10: | 3.040 | 0.392 | 1.92286 | 20.8 | |
| 11: | 10.735 | (D11) | | | |
| 12: | 0.000 | (D12) | | | (APERTURE STOP) |
| 13: | 2.656 | 0.746 | 1.61800 | 63.4 | |
| 14: | −6.005 | 0.071 | | | |
| 15: | 2.325 | 0.339 | 1.60300 | 65.5 | |
| 16: | 8.890 | 0.112 | 1.80610 | 33.3 | |
| 17: | 1.735 | (D17) | | | |
| 18: | −4.663 | 0.112 | 1.80610 | 40.7 | |
| 19: | −6.843 | (D19) | | | |
| 20: | 3.582 | 0.519 | 1.58913 | 61.3 | |
| 21: | −3.410 | 0.103 | 1.92286 | 20.8 | |
| 22: | −4.897 | (D22) | | | |
| 23: | 0.000 | 0.267 | 1.51680 | 64.2 | |
| 24: | 0.000 | (Bf) | | | |

In the zoom lens 1, the object-side surface (the 13th surface) of the biconvex lens L31 of the third lens group G3 and the object-side surface (the 20th surface) of the cemented positive lens L5 of the fifth lens group G5 are formed of aspherical surfaces. The 4th-, 6th-, 8th-, and 10th-order aspherical coefficients A, B, C, and D of these surfaces in the first numerical example are shown in Table 2 along with cone constants "κ". In Table 2, "E-i" is an exponential representation which is to base 10, i.e., "$10^{-i}$"; for example, "0.12345E−05" represents "$0.12345 \times 10^{-5}$".

TABLE 2

| 13TH SURFACE | κ = −0.3727 | A = −0.813393E−02 | B = +0.228368E−03 | C = −0.126371E−02 |
|---|---|---|---|---|
| | | D = +0.100851E−02 | | |
| 20TH SURFACE | κ = 1.5265 | A = −0.107877E−01 | B = +0.208699E−02 | C = −0.234305E−02 |
| | | D = +0.675184E−03 | | |

In the zoom lens 1, the surface distance D5 between the first lens group G1 and the second lens group G2, the surface distance D11 between the second lens group G2 and the aperture stop S, the surface distance D12 between the aperture stop S and the third lens group G3, the surface distance D17 between the third lens group G3 and the fourth lens group G4, the surface distance D19 between the fourth lens group G4 and the fifth lens group G5, and the surface distance D22 between the fifth lens group G5 and the filter FL vary during zooming from the maximum wide angle state to the maximum telephoto state. The values of the respective distances in the first numerical example during its wide-angle end (f=1.000), its first intermediate focal length (f=2.486), its second intermediate focal length (f=6.236), and its telephoto end (f=18.777) are shown in Table 3 along with focal lengths "f", maximum aperture F-numbers "FNO" and angles of view "2ω".

TABLE 3

| f | 1.000 | 2.486 | 6.236 | 18.777 |
|---|---|---|---|---|
| FNO | 2.87 | 3.90 | 3.52 | 4.45 |
| 2ω | 74.62 | 32.43 | 13.31 | 4.37° |
| D5 | 0.140 | 2.280 | 5.451 | 7.602 |
| D11 | 6.451 | 3.660 | 1.103 | 0.582 |
| D12 | 1.556 | 0.028 | 0.858 | 0.515 |
| D17 | 0.429 | 2.143 | 2.829 | 3.172 |
| D19 | 1.908 | 1.096 | 0.470 | 1.951 |
| D22 | 1.726 | 2.538 | 3.164 | 1.683 |
| Bf | 0.221 | 0.221 | 0.221 | 0.221 |

The values corresponding to the respective conditional expressions (1) through (10) of the first numerical example are shown in Table 4.

TABLE 4 f2 = −1.914
f4 = −18.583
β5t = 0.424
β2w = −0.229
β2t = −2.175
f1 = 11.311
f1a = 53.076
(1) f2/f4 = 0.103
(2) Δ3/ft = 0.146
(3) D4/TL = 0.221
(4) β5t = 0.424
(5) β2w · β2t = 0.499
(6) |f4|/ft = 0.99
(7) f1/f1a = 0.213
(8) vd1P = 81.6
(9) n2a = 1.755
(10) (r2d + r3e)/fw = 7.475

Figure 3:
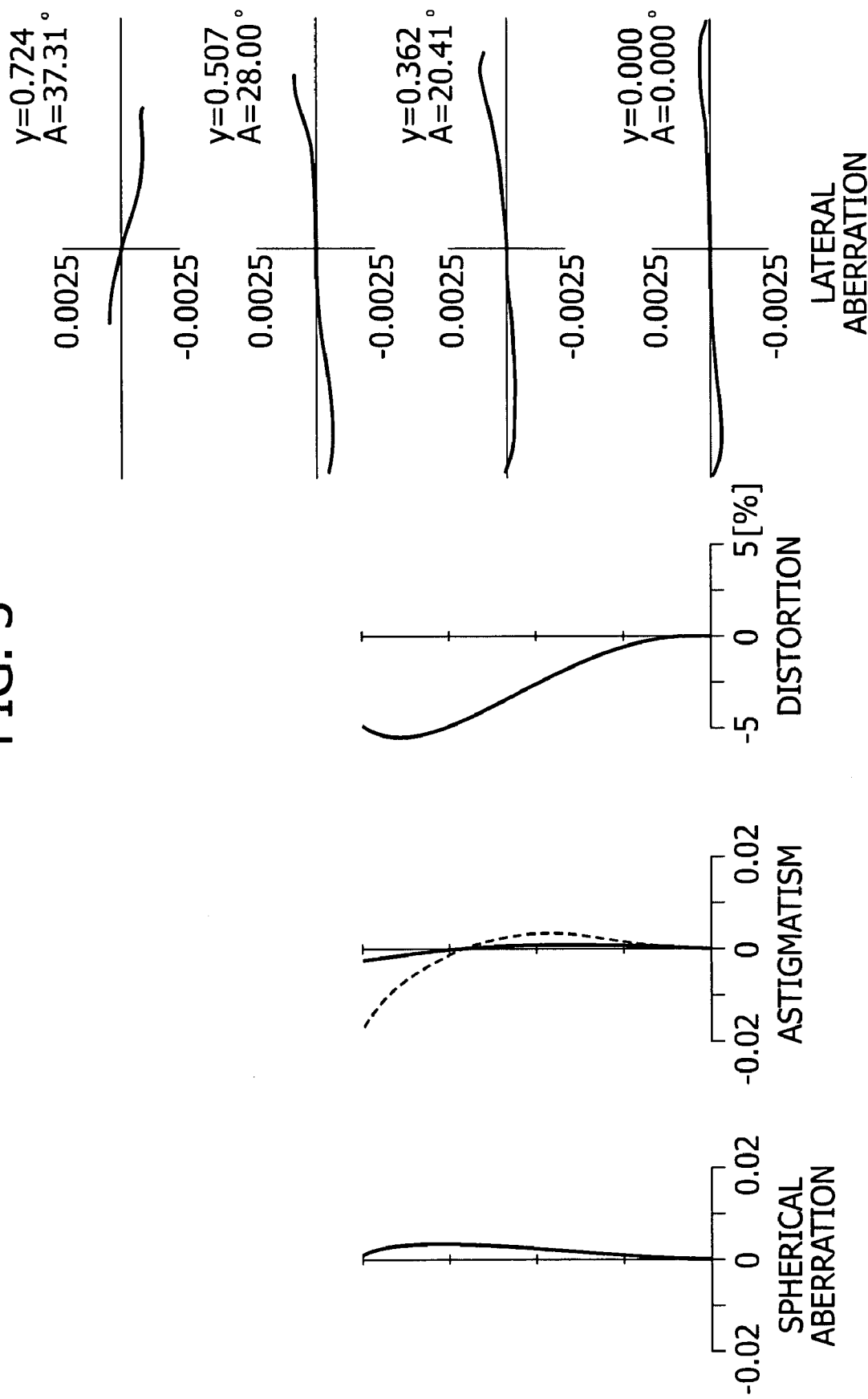
FIG. 3 shows graphs, along with FIGS. 4 to 6, of aberrations of a first numerical example obtained by applying specific values to the first embodiment, FIG. 3 showing a spherical aberration, an astigmatism, a distortion, and lateral aberrations measured during a maximum wide angle state.
Figure 4:
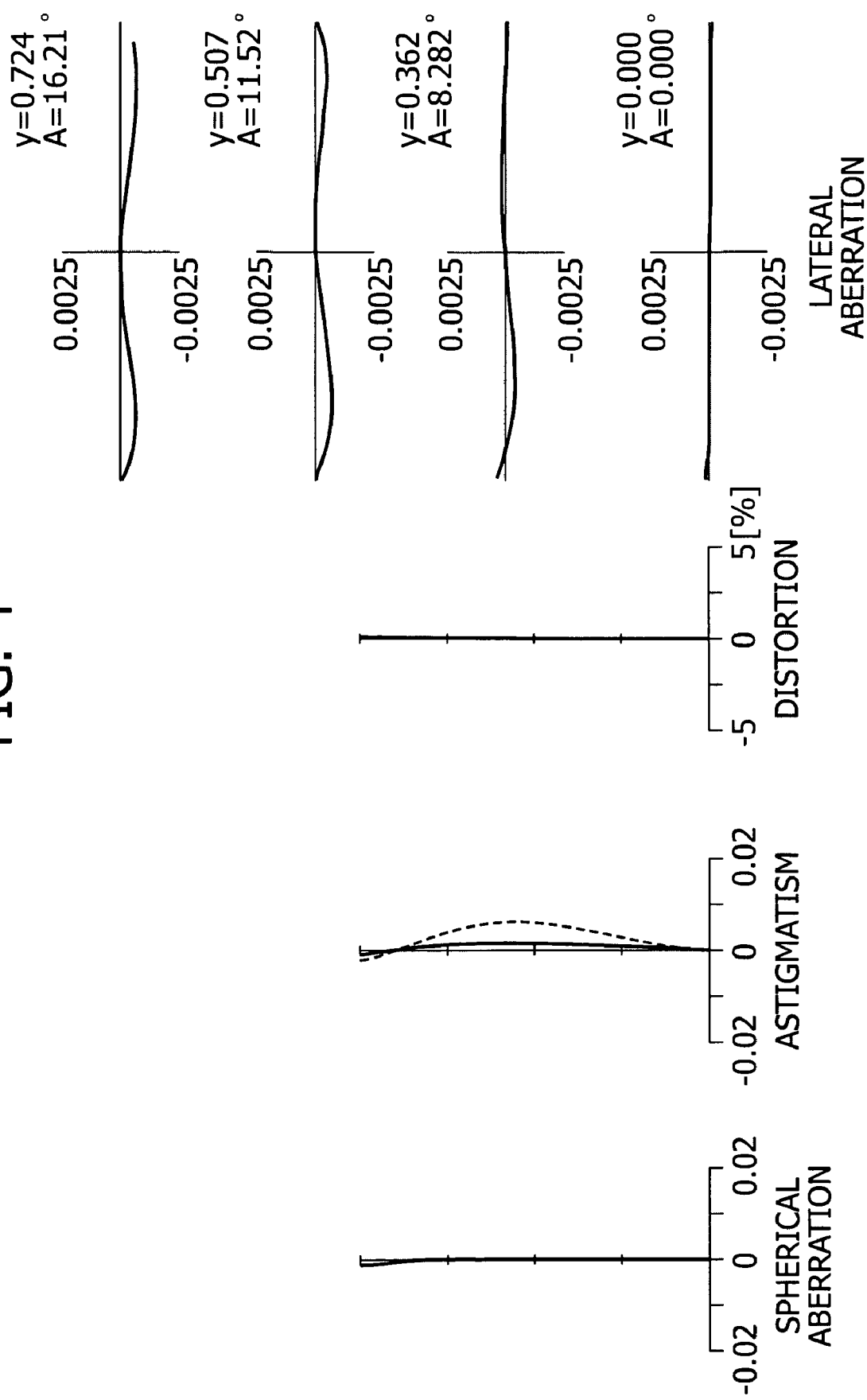
FIG. 4 shows graphs of a spherical aberration, an astigmatism, a distortion, and lateral aberrations measured during a first intermediate focal length state.
Figure 5:
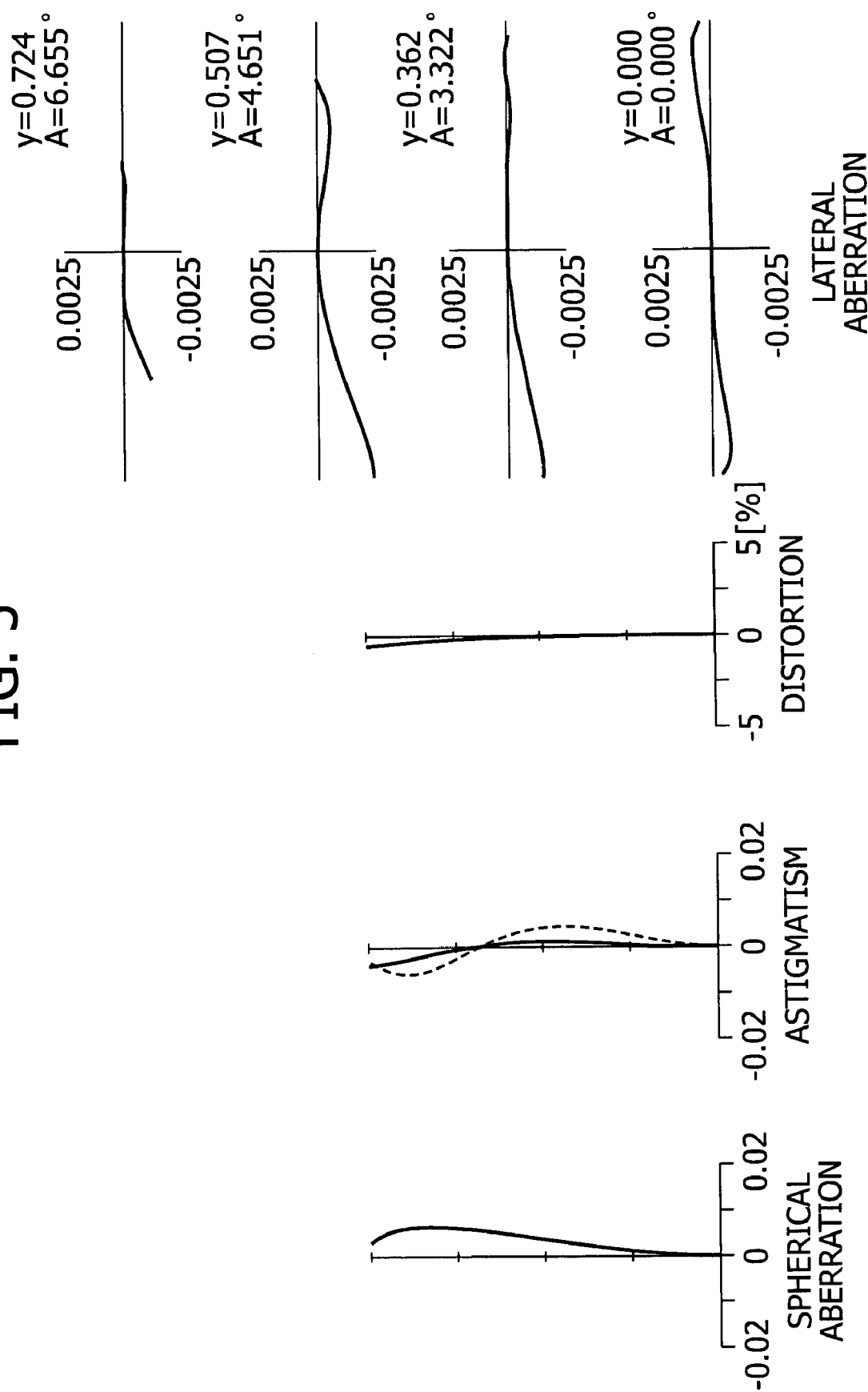
FIG. 5 shows graphs of a spherical aberration, an astigmatism, a distortion, and lateral aberrations measured during a second intermediate focal length state.
Figure 6:
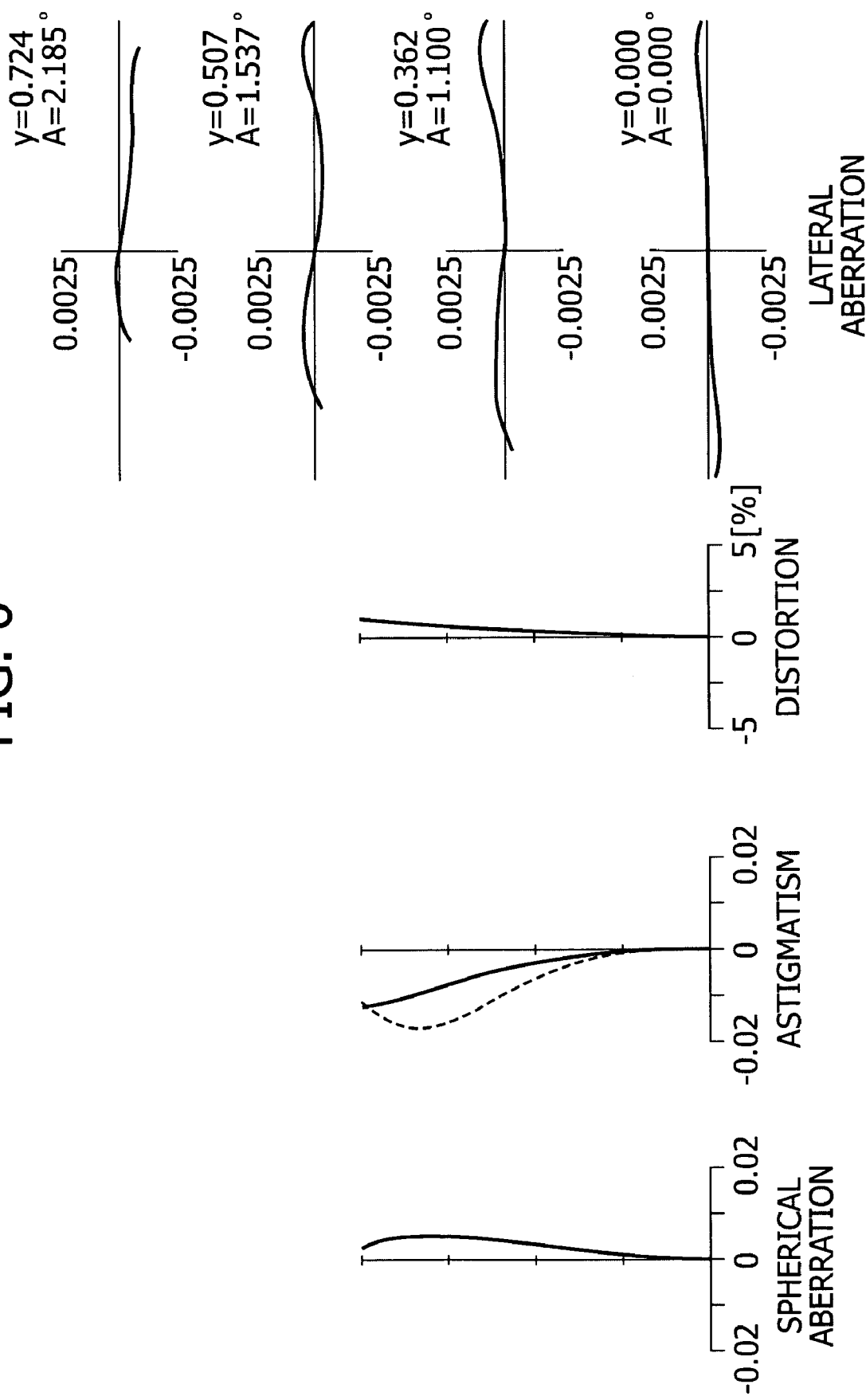
FIG. 6 shows graphs of a spherical aberration, an astigmatism, a distortion, and lateral aberrations measured during a maximum telephoto state.

Each of FIGS. 3 to 6 shows various aberration graphs in the first numerical example which is in focus at infinity. FIG. 3 shows various aberration graphs obtained during the maximum wide angle state (f=1.000), FIG. 4 shows various aberration graphs obtained during the first intermediate focal length state (f=2.486), FIG. 5 shows various aberration graphs obtained during the second intermediate focal length state (f=6.236), and FIG. 6 shows various aberration graphs obtained during the maximum telephoto state (f=18.777).

In the aberration graphs in each of FIGS. 3 to 6, a solid line in a spherical aberration graph represents a spherical aberration, a solid line and a dashed line in an astigmatism graph represent a sagittal image plane and a meridional image plane, respectively. In a lateral aberration graph, A represents an angle of view and y represents an image height.

From the respective aberration graphs, it is apparent that the first numerical example has its aberrations satisfactorily corrected and thus has superior image-forming performance.

Figure 7:
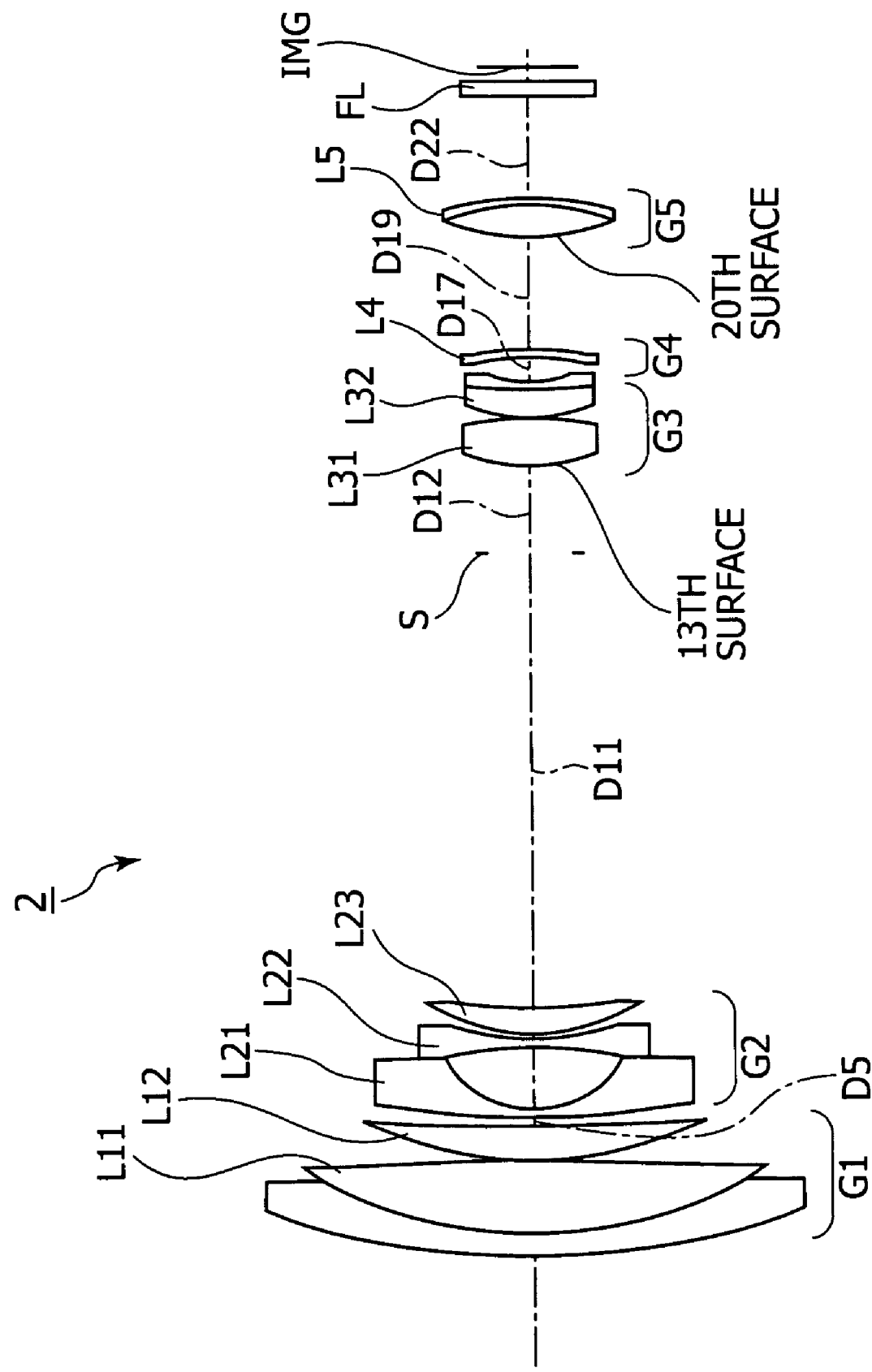
FIG. 7 is a diagram showing the lens construction of a zoom lens according to a second embodiment of the present invention.

FIG. 7 is a diagram showing the lens construction of a zoom lens 2 according to a second embodiment of the present invention. A first lens group G1 is constructed by positioning, in the order from the object side to the image-plane side, a cemented lens L11 formed of a meniscus-shaped negative lens having a convex surface facing the object side and a positive lens having a convex surface facing the object side, and a positive lens L12 having a convex surface facing the object side. A second lens group G2 is constructed by positioning, in the order from the object side to the image-plane side, a meniscus-shaped negative lens L21 having a concave surface facing the image side, a biconcave negative lens L22, and a positive lens L23 having a convex surface facing the object side. A third lens group G3 is constructed by positioning, in the order from the object side to the image-plane side, a biconvex positive lens L31 having a convex surface facing the object side and having the object-side surface formed of an aspherical surface, and a cemented negative lens L32 formed of a positive lens having a convex surface facing the object side and a negative lens having a concave surface facing the image side. A fourth lens group G4 is constructed of a meniscus-shaped negative lens L4 having a concave surface facing the object side. A fifth lens group G5 is constructed of a cemented positive lens L5 formed by positioning, in the order from the object side to the image-plane side, a biconvex positive lens having an object-side surface formed of an aspherical surface, and a meniscus-shaped negative lens having a concave surface facing the object side.

An aperture stop S is disposed on the object side of the third lens group G3, and moves along a locus independent of the third lens group G3 during the change of the lens zoom position.

Furthermore, a filter FL such as a low-pass filter is disposed between the fifth lens group G5 and an image plane IMG.

Table 5 shows the lens data of a second numerical example in which specific values are applied to the zoom lens 2.

TABLE 5

| SURFACE NUMBER | CURVATURE RADIUS | SURFACE DISTANCE | REFRACTIVE INDEX | ABBE NUMBER |
|---|---|---|---|---|
| 1: | 11.511 | 0.358 | 1.90366 | 31.1 |
| 2: | 6.508 | 1.218 | 1.49700 | 81.6 |
| 3: | −156.675 | 0.038 | | |
| 4: | 6.292 | 0.534 | 1.60300 | 65.5 |
| 5: | 30.571 | (D5) | | |
| 6: | 13.388 | 0.132 | 1.75500 | 52.3 |
| 7: | 1.645 | 1.058 | | |
| 8: | −7.344 | 0.113 | 1.75500 | 52.3 |
| 9: | 4.406 | 0.066 | | |
| 10: | 3.098 | 0.437 | 1.92286 | 20.8 |
| 11: | 9.643 | (D11) | | |
| 12: | 0.000 | (D12) | | (APERTURE STOP) |
| 13: | 2.718 | 0.753 | 1.61800 | 63.4 |
| 14: | −6.815 | 0.019 | | |
| 15: | 2.333 | 0.482 | 1.60300 | 65.5 |
| 16: | 9.712 | 0.113 | 1.80610 | 33.3 |
| 17: | 1.694 | (D17) | | |
| 18: | −4.705 | 0.113 | 1.80610 | 40.7 |
| 19: | −6.883 | (D19) | | |
| 20: | 3.426 | 0.510 | 1.58913 | 61.3 |
| 21: | −3.371 | 0.104 | 1.92286 | 20.8 |
| 22: | −4.857 | (D22) | | |
| 23: | 0.000 | 0.269 | 1.51680 | 64.2 |
| 24: | 0.000 | (Bf) | | |

In the zoom lens 2, the object-side surface (the 13th surface) of the biconvex lens L31 of the third lens group G3 and the object-side surface (the 20th surface) of the cemented positive lens L5 of the fifth lens group G5 are formed of aspherical surfaces. The 4th-, 6th-, 8th-, and 10th-order aspherical coefficients A, B, C, and D of these surfaces in the second numerical example are shown in Table 6 along with cone constants "κ".

TABLE 6

| 13TH SURFACE | κ = −0.2267 | A = −0.753075E−02  B = +0.980418E−06  C = −0.741406E−03<br>D = +0.625055E−03 |
|---|---|---|
| 20TH SURFACE | κ = −1.9803 | A = −0.355047E−03  B = +0.203291E−02  C = −0.173856E−02<br>D = +0.539025E−03 |

In the zoom lens 2, the surface distance D5 between the first lens group G1 and the second lens group G2, the surface distance D11 between the second lens group G2 and the aperture stop S, the surface distance D12 between the aperture stop S and the third lens group G3, the surface distance D17 between the third lens group G3 and the fourth lens group G4, the surface distance D19 between the fourth lens group G4 and the fifth lens group G5, and the surface distance D22 between the fifth lens group G5 and the filter FL vary during zooming from the maximum wide angle state to the maximum telephoto state. The values of the respective distances in the second numerical example during its wide-angle end (f=1.000), its first intermediate focal length (f=2.595), its second intermediate focal length (f=6.924), and its telephoto end (f=18.776) are shown in Table 7 along with focal lengths "f", maximum aperture F-numbers "FNO", and angles of view "2ω".

TABLE 7

| f | 1.000 | 2.595 | 6.924 | 18.776 |
|---|---|---|---|---|
| FNO | 2.87 | 3.76 | 3.58 | 4.46 |
| 2ω | 75.16 | 31.47 | 12.13 | 4.41° |
| D5 | 0.141 | 2.203 | 5.149 | 6.842 |
| D11 | 7.493 | 3.863 | 1.285 | 0.597 |
| D12 | 1.441 | 0.028 | 0.589 | 0.269 |
| D17 | 0.395 | 1.996 | 2.636 | 2.956 |
| D19 | 1.885 | 1.032 | 0.484 | 1.979 |
| D22 | 1.669 | 2.522 | 3.070 | 1.574 |
| Bf | 0.223 | 0.223 | 0.223 | 0.223 |

The values corresponding to the respective conditional expressions (1) through (10) of the second numerical example are shown in Table 8.

TABLE 8

$f2 = -2.006$
$f4 = -18.879$
$\beta 5t = 0.433$
$\beta 2w = -0.268$
$\beta 2t = -2.601$ TABLE 8-continued f1 = 10.565
f1a = 49.939
(1) f2/f4 = 0.106
(2) Δ3/ft = 0.136
(3) D4/TL = 0.224
(4) β5t = 0.433
(5) β2w · β2t = 0.698
(6) |f4|/ft = 1.005
(7) f1/f1a = 0.212
(8) vd1P = 81.6
(9) n2a = 1.755
(10) (r2d + r3e)/fw = 7.504

Figure 8:
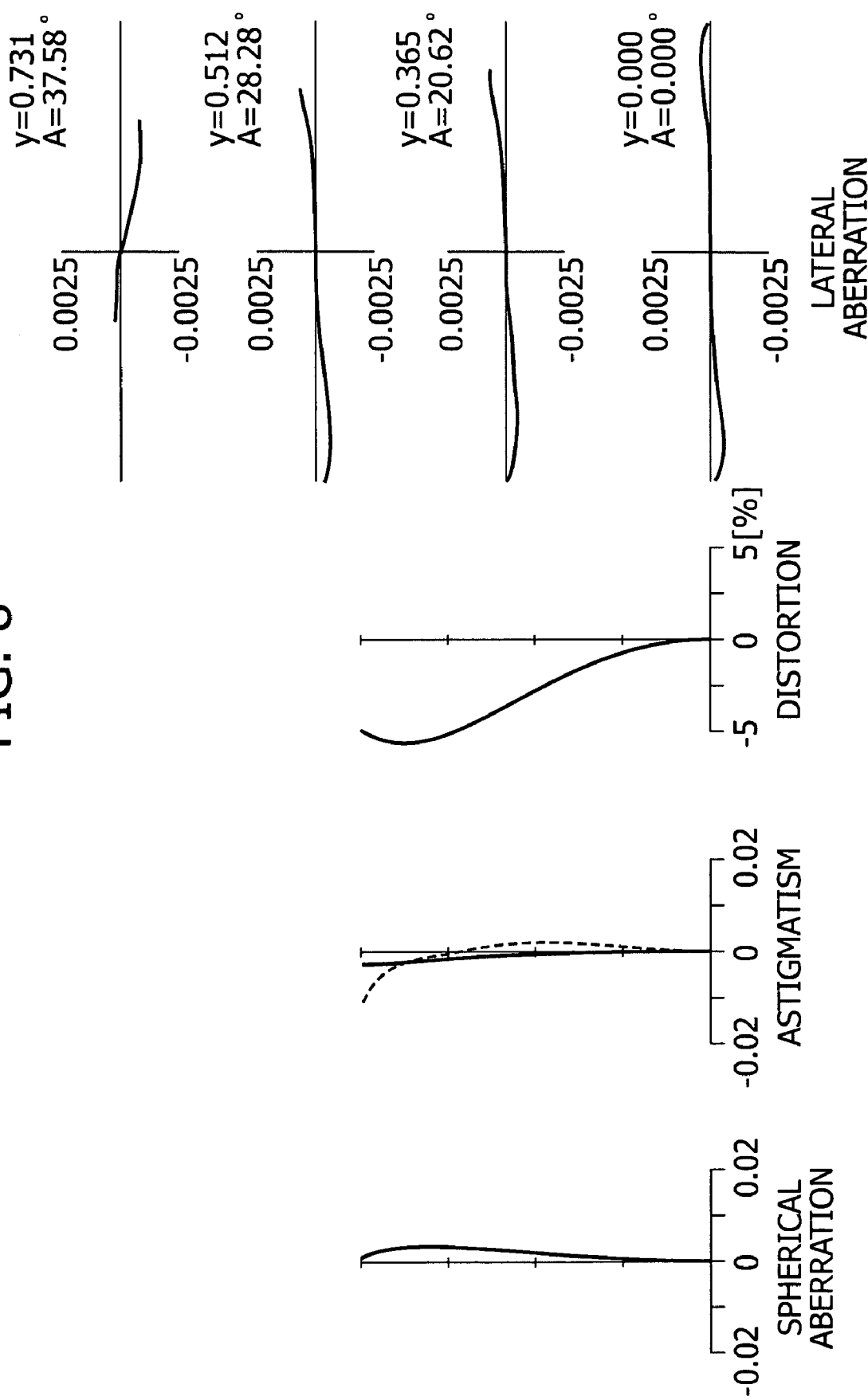
FIG. 8 shows graphs, along with FIGS. 9 to 11, of aberrations of a second numerical example obtained by applying specific values to the second embodiment, FIG. 8 showing a spherical aberration, an astigmatism, a distortion, and lateral aberrations measured during the maximum wide angle state.
Figure 9:
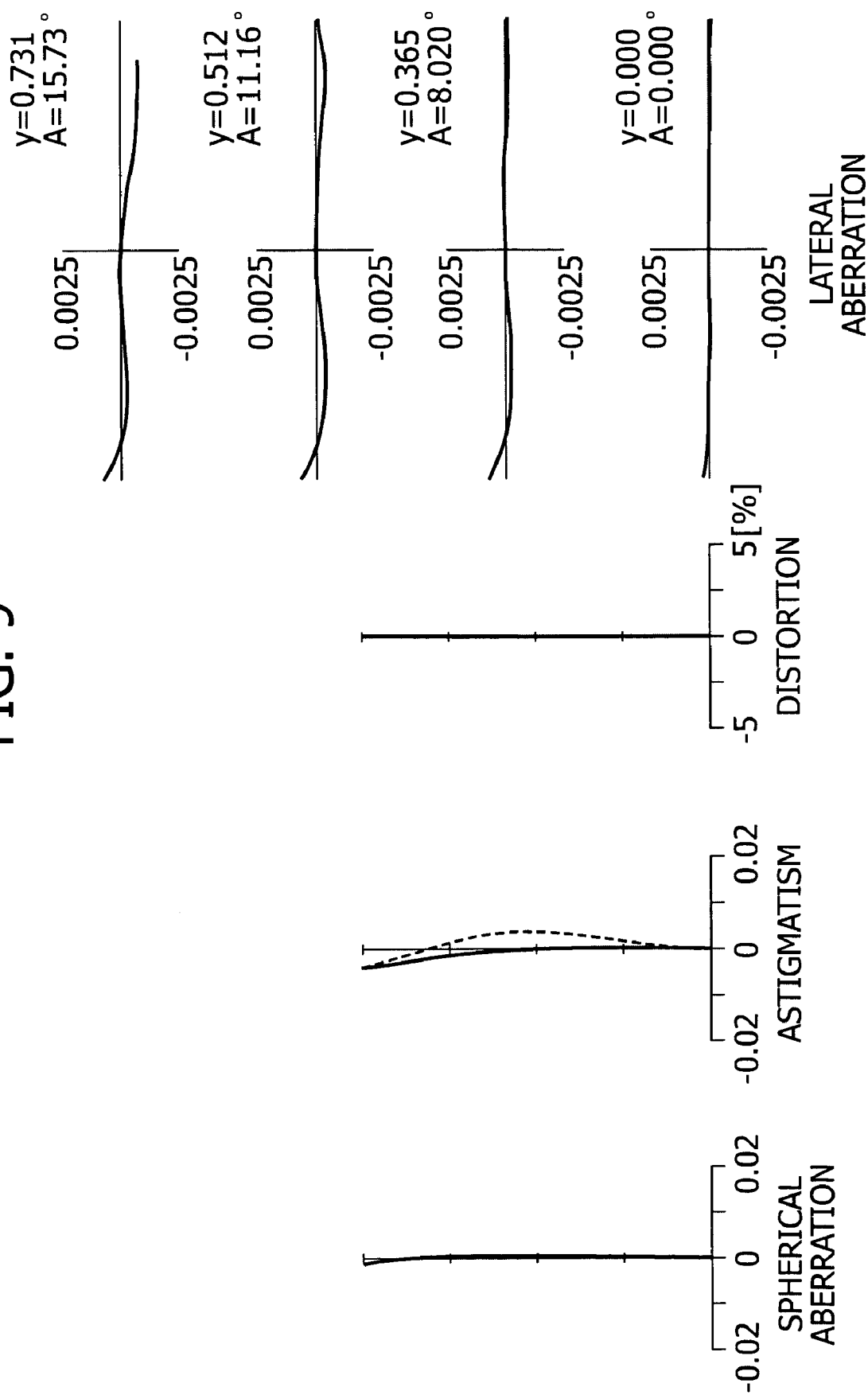
FIG. 9 shows graphs of a spherical aberration, an astigmatism, a distortion, and lateral aberrations measured during the first intermediate focal length state.
Figure 10:
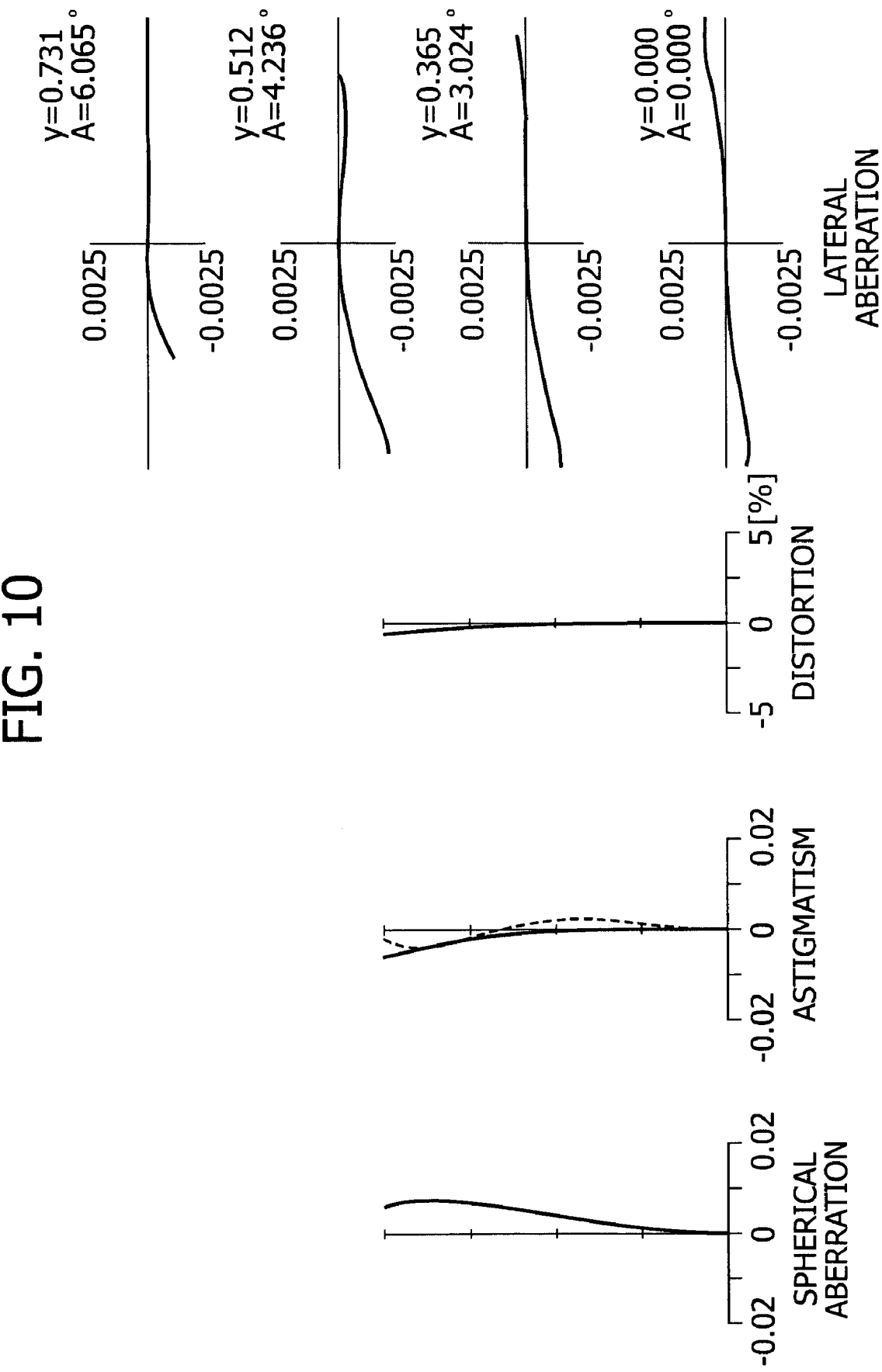
FIG. 10 shows graphs of a spherical aberration, an astigmatism, a distortion, and lateral aberrations measured during the second intermediate focal length state.
Figure 11:
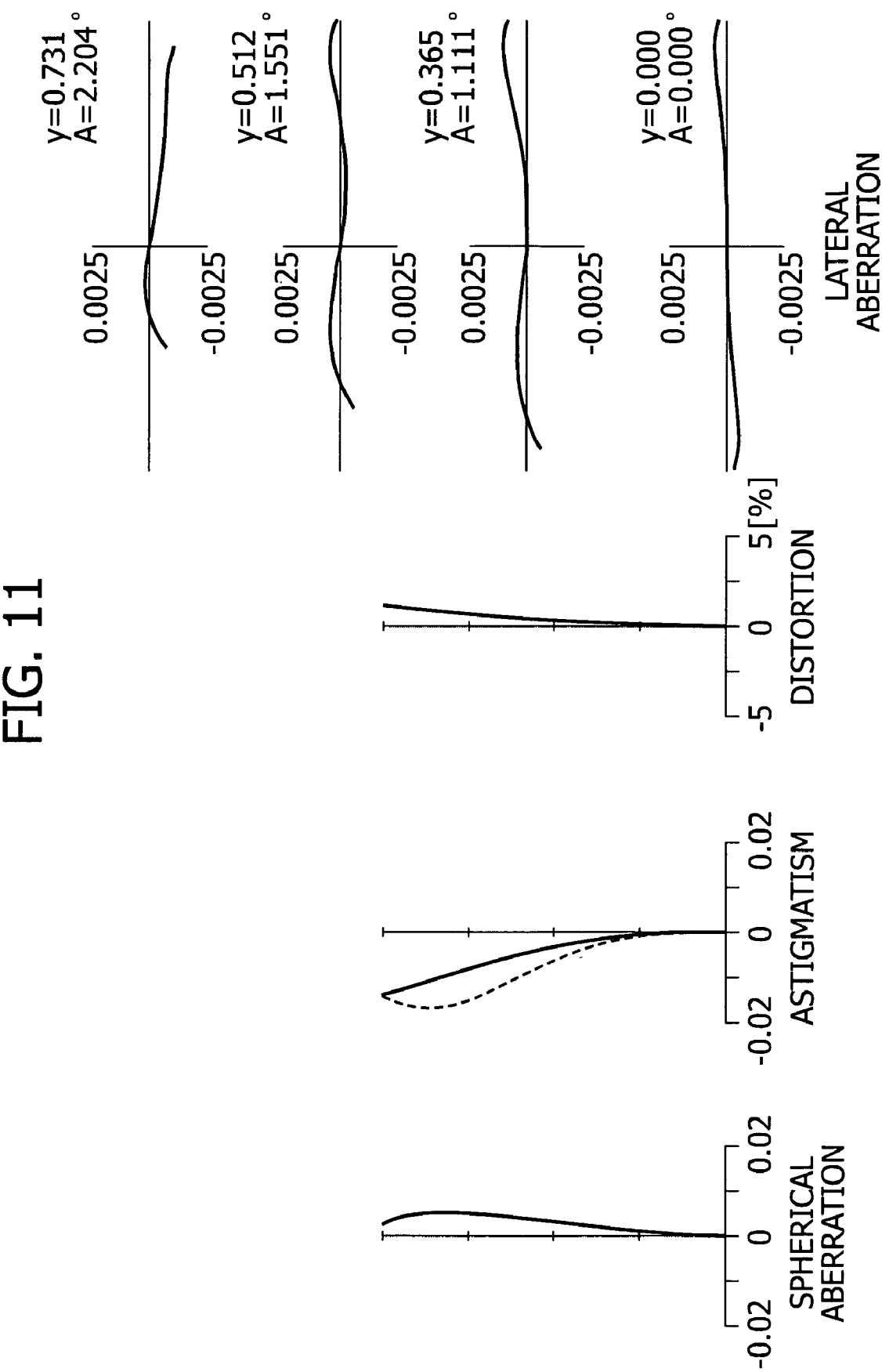
FIG. 11 shows graphs of a spherical aberration, an astigmatism, a distortion, and lateral aberrations measured during the maximum telephoto state.

Each of FIGS. 8 to 11 shows various aberration graphs in the second numerical example which is in focus at infinity. FIG. 8 shows various aberration graphs obtained during the maximum wide angle state (f=1.000), FIG. 9 shows various aberration graphs obtained during the first intermediate focal length state (f=2.595), FIG. 10 shows various aberration graphs obtained during the second intermediate focal length state (f=6.924), and FIG. 11 shows various aberration graphs obtained during the maximum telephoto state (f=18.776).

In the aberration graphs in each of FIGS. 8 to 11, a solid line in a spherical aberration graph represents a spherical aberration, a solid line and a dashed line in an astigmatism graph represent a sagittal image plane and a meridional image plane, respectively. In a lateral aberration graph, A represents an angle of view and y represents an image height.

The respective aberration graphs clearly demonstrate that the second numerical example has the aberrations satisfactorily corrected and thus has superior image-forming performance.

Figure 12:
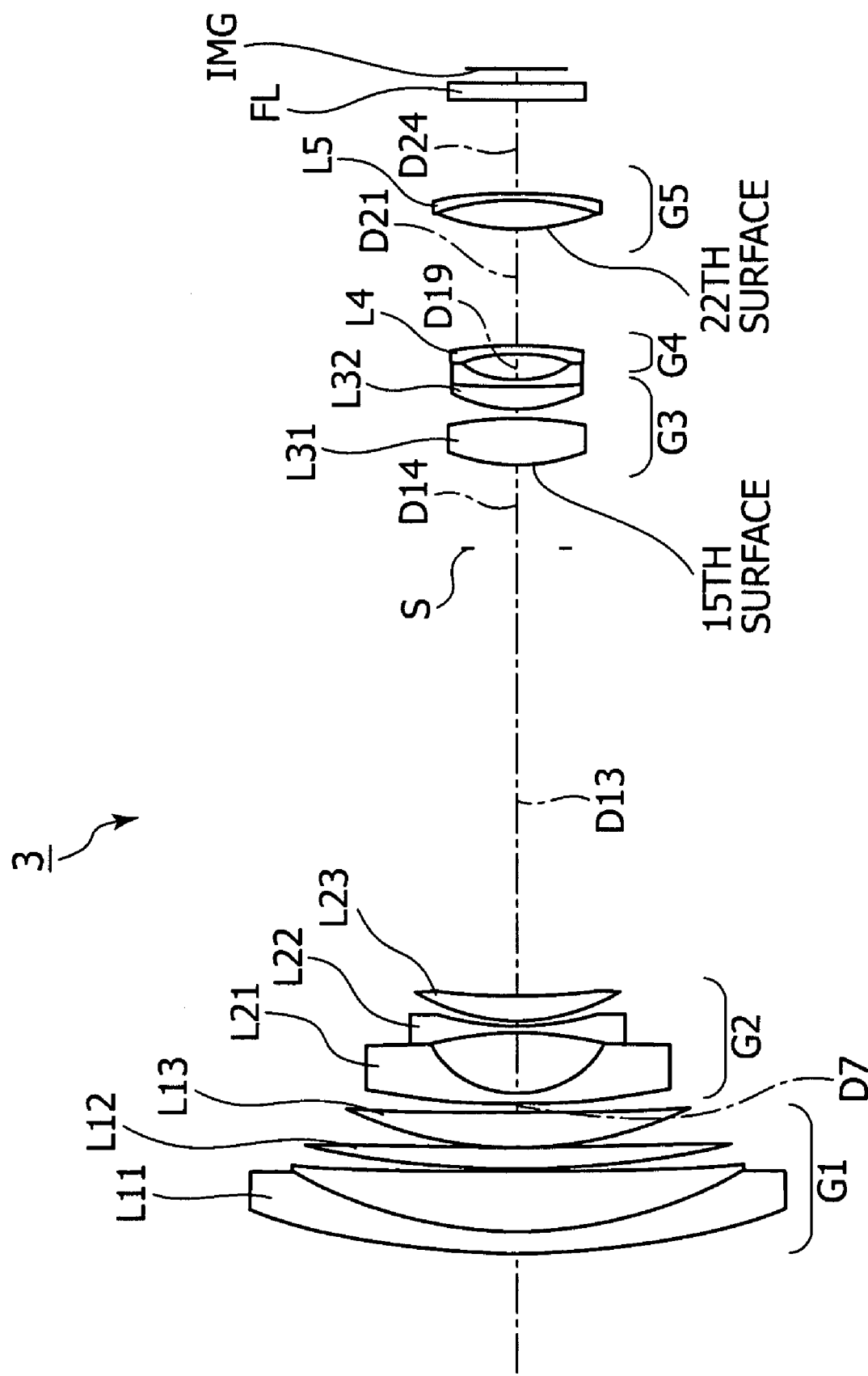
FIG. 12 is a diagram showing the lens construction of a zoom lens according to a third embodiment of the present invention.

FIG. 12 is a diagram showing the lens construction of a zoom lens 3 according to a third embodiment of the present invention. A first lens group G1 is constructed by positioning, in the order from the object side to the image-plane side, a cemented lens L11 formed of a meniscus-shaped negative lens having a convex surface facing the object side and a positive lens having a convex surface facing the object side, a positive lens L12 having a convex surface facing the object side, and a positive lens L13 having a convex surface facing the object side. A second lens group G2 is constructed by positioning, in the order from the object side to the image-plane side, a meniscus-shaped negative lens L21 having a concave surface facing the image side, a biconcave negative lens L22, and a positive lens L23 having a convex surface facing the object side. A third lens group G3 is constructed by positioning, in the order from the object side to the image-plane side, a biconvex positive lens L31 having a convex surface facing the object side and having the object-side surface formed of an aspherical surface, and a cemented negative lens L32 formed of a positive lens having a convex surface facing the object side and a negative lens having a concave surface facing the image side. A fourth lens group G4 is constructed of a meniscus-shaped negative lens L4 having a concave surface facing the object side. A fifth lens group G5 is constructed of a cemented positive lens L5 formed by positioning, in the order from the object side to the image-plane side, a biconvex positive lens having an object-side surface formed of an aspherical surface, and a meniscus-shaped negative lens having a concave surface facing the object side.

An aperture stop S is disposed on the object side of the third lens group G3, and moves along a locus independent of the third lens group G3 during the change of the lens zoom position.

Furthermore, a filter FL such as a low-pass filter is disposed between the fifth lens group G5 and an image plane IMG.

Table 9 shows the lens data of a third numerical example in which specific values are applied to the zoom lens 3.

TABLE 9

| SURFACE NUMBER | CURVATURE RADIUS | SURFACE DISTANCE | REFRACTIVE INDEX | ABBE NUMBER | |
|---|---|---|---|---|---|
| 1: | 12.315 | 0.354 | 1.90366 | 31.1 | |
| 2: | 6.572 | 0.981 | 1.49700 | 81.6 | |
| 3: | 37.374 | 0.037 | | | |
| 4: | 14.082 | 0.315 | 1.60300 | 65.5 | |
| 5: | 28.007 | 0.037 | | | |
| 6: | 6.613 | 0.563 | 1.60300 | 65.5 | |
| 7: | 43.947 | 0.140 | | | |
| 8: | 12.329 | 0.136 | 1.75500 | 52.3 | |
| 9: | 1.589 | 1.022 | | | |
| 10: | −6.847 | 0.112 | 1.75500 | 52.3 | |
| 11: | 4.350 | 0.071 | | | |
| 12: | 3.047 | 0.418 | 1.92286 | 20.8 | |
| 13: | 9.548 | (D13) | | | |
| 14: | 0.000 | (D14) | | | (APERTURE STOP) |
| 15: | 2.723 | 0.746 | 1.61800 | 63.4 | |
| 16: | −6.505 | 0.173 | | | |
| 17: | 2.177 | 0.373 | 1.60300 | 65.5 | |
| 18: | 10.138 | 0.112 | 1.80610 | 33.3 | |
| 19: | 1.679 | (D19) | | | |
| 20: | −4.663 | 0.112 | 1.74950 | 35.3 | |
| 21: | −6.665 | (D21) | | | |
| 22: | 3.294 | 0.468 | 1.58913 | 61.3 | |
| 23: | −3.997 | 0.103 | 1.92286 | 20.8 | |
| 24: | −5.868 | (D24) | | | |
| 25: | 0.000 | 0.267 | 1.51680 | 64.2 | |
| 26: | 0.000 | (Bf) | | | |

In the zoom lens 3, the object-side surface (the 15th surface) of the biconvex lens L31 of the third lens group G3 and the object-side surface (the 22nd surface) of the cemented positive lens L5 of the fifth lens group G5 are formed of aspherical surfaces. The 4th-, 6th-, 8th-, and 10th-order aspherical coefficients A, B, C, and D of these surfaces in the third numerical example are shown in Table 10 along with cone constants "κ".

TABLE 10

| 15TH SURFACE | κ = −0.1697 | A: −0.820141E−02 D: 0.925580E−03 | B: 0.128802E−03 | C: −0.110335E−02 |
|---|---|---|---|---|
| 22ND SURFACE | κ = −2.0657 | A: 0.793996E−03 D: 0.803339E−03 | B: 0.281684E−02 | C: −0.251941E−02 |

In the zoom lens 3, the surface distance D7 between the first lens group G1 and the second lens group G2, the surface distance D13 between the second lens group G2 and the aperture stop S, the surface distance D14 between the aperture stop S and the third lens group G3, the surface distance D19 between the third lens group G3 and the fourth lens group G4, the surface distance D21 between the fourth lens group G4 and the fifth lens group G5, and the surface distance D24 between the fifth lens group G5 and the filter FL vary during zooming from the maximum wide angle state to the maximum telephoto state. The values of the respective distances in the third numerical example during its wide-angle end (f=1.000), its first intermediate focal length (f=2.614), its second intermediate focal length (f=7.091), and its telephoto end (f=18.778) are shown in Table 11 along with focal lengths "f", maximum aperture F-numbers "FNO", and angles of view "2ω".

TABLE 11

| f | 1.000 | 2.614 | 7.091 | 18.778 |
|---|---|---|---|---|
| FNO | 2.87 | 3.70 | 3.61 | 4.46 |
| 2ω | 74.62 | 30.89 | 11.71 | 4.36° |
| D7 | 0.140 | 2.292 | 5.207 | 6.765 |
| D13 | 7.357 | 3.804 | 1.447 | 0.774 |
| D14 | 1.348 | 0.028 | 0.435 | 0.134 |
| D19 | 0.397 | 1.903 | 2.506 | 2.807 |
| D21 | 1.947 | 1.066 | 0.540 | 2.023 |
| D24 | 1.526 | 2.408 | 2.933 | 1.450 |
| Bf | 0.221 | 0.221 | 0.221 | 0.221 |

The values corresponding to the respective conditional expressions (1) through (10) of the third numerical example are,.shown in Table 12.

TABLE 12 f2 = −1.938
f4 = −21.222
β5t = 0.484
β2w = −0.262
β2t = −2.530
f1 = 10.421
f1a = −1511.65
(1) f2/f4 = 0.091
(2) Δ3/ft = 0.128
(3) D4/TL = 0.220
(4) β5t = 0.484
(5) β2w · β2t = 0.663
(6) |f4|/ft = 1.130
(7) f1/f1a = −0.007
(8) vd1P = 81.6
(9) n2a = 1.755
(10) (r2d + r3e)/fw = 7.397

Figure 13:
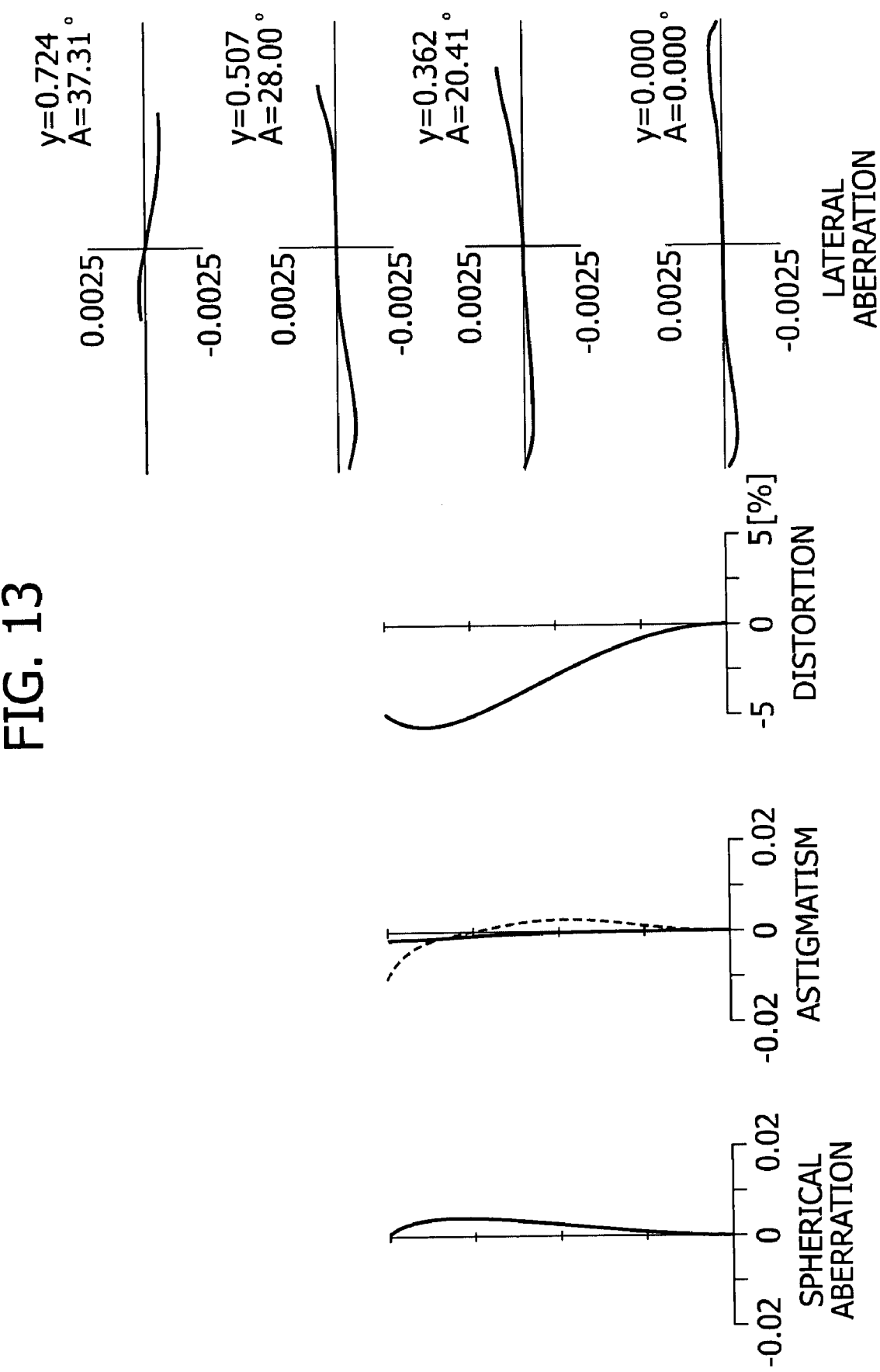
FIG. 13 shows graphs, along with FIGS. 14 to 16, of aberrations of a third numerical example obtained by applying specific values to the third embodiment, FIG. 13 showing a spherical aberration, an astigmatism, a distortion, and lateral aberrations measured during the maximum wide angle state.
Figure 14:
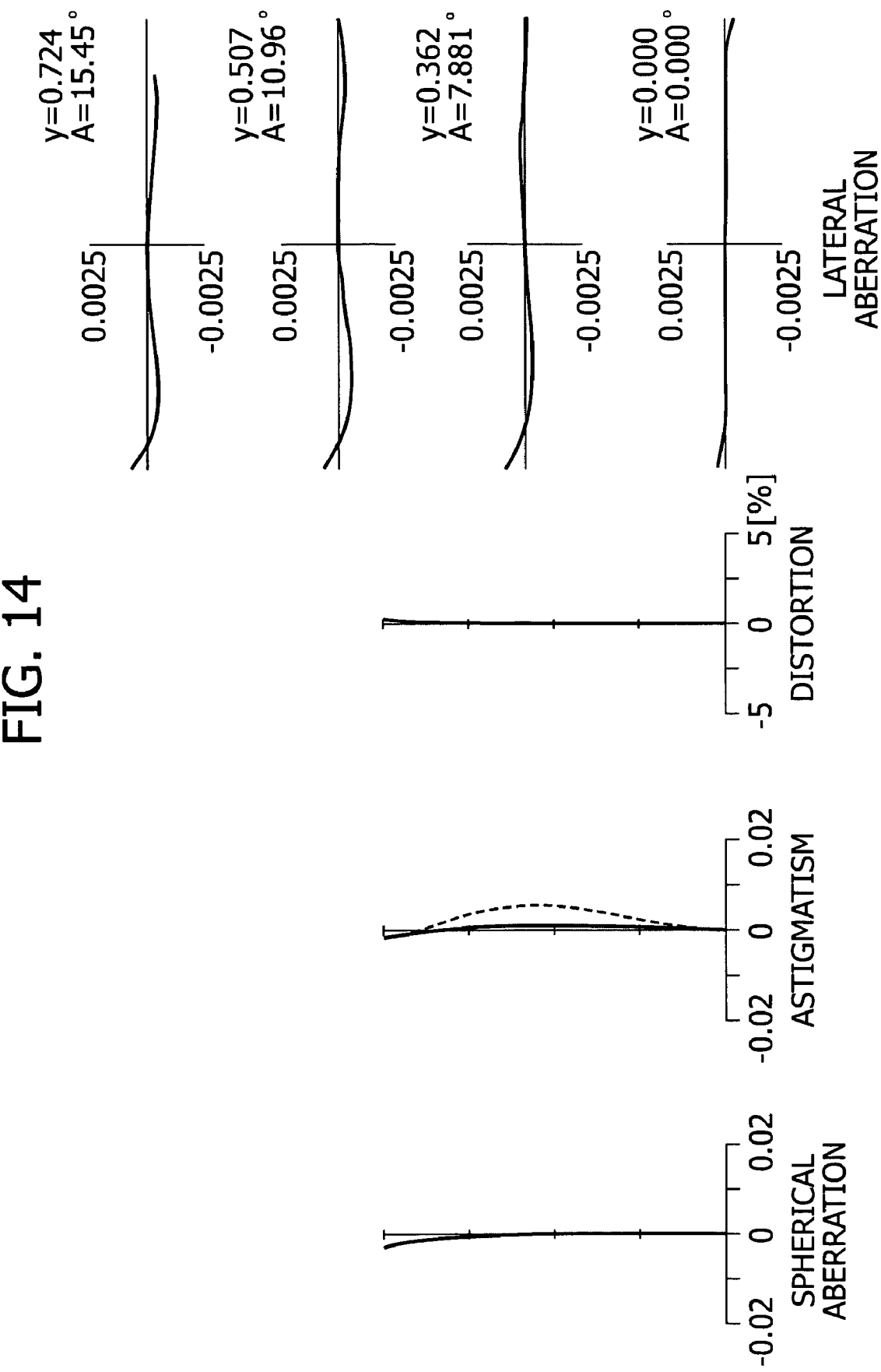
FIG. 14 shows graphs of a spherical aberration, an astigmatism, a distortion, and lateral aberrations measured during the first intermediate focal length state.
Figure 15:
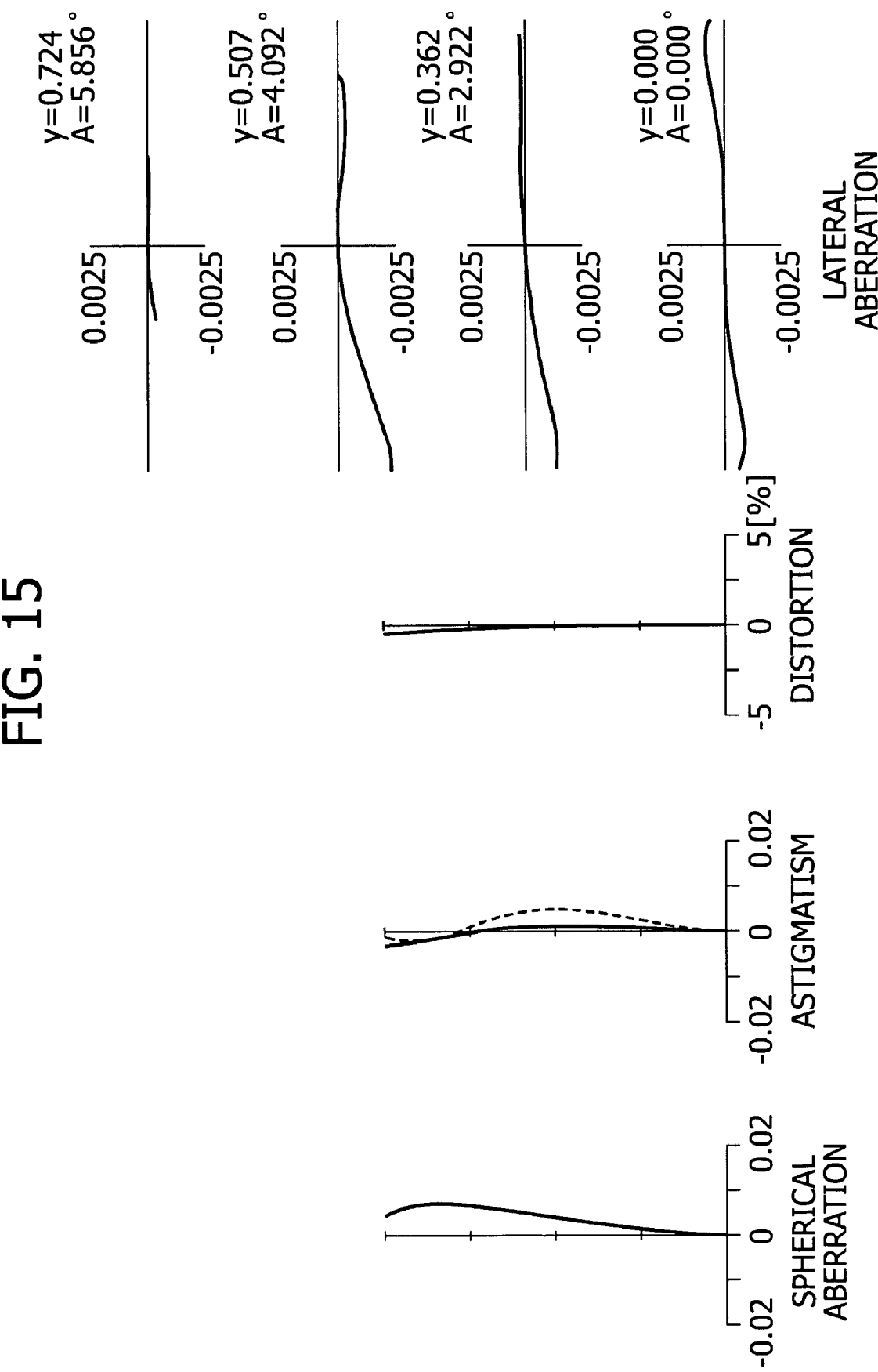
FIG. 15 shows graphs of a spherical aberration, an astigmatism, a distortion, and lateral aberrations measured during the second intermediate focal length state.
Figure 16:
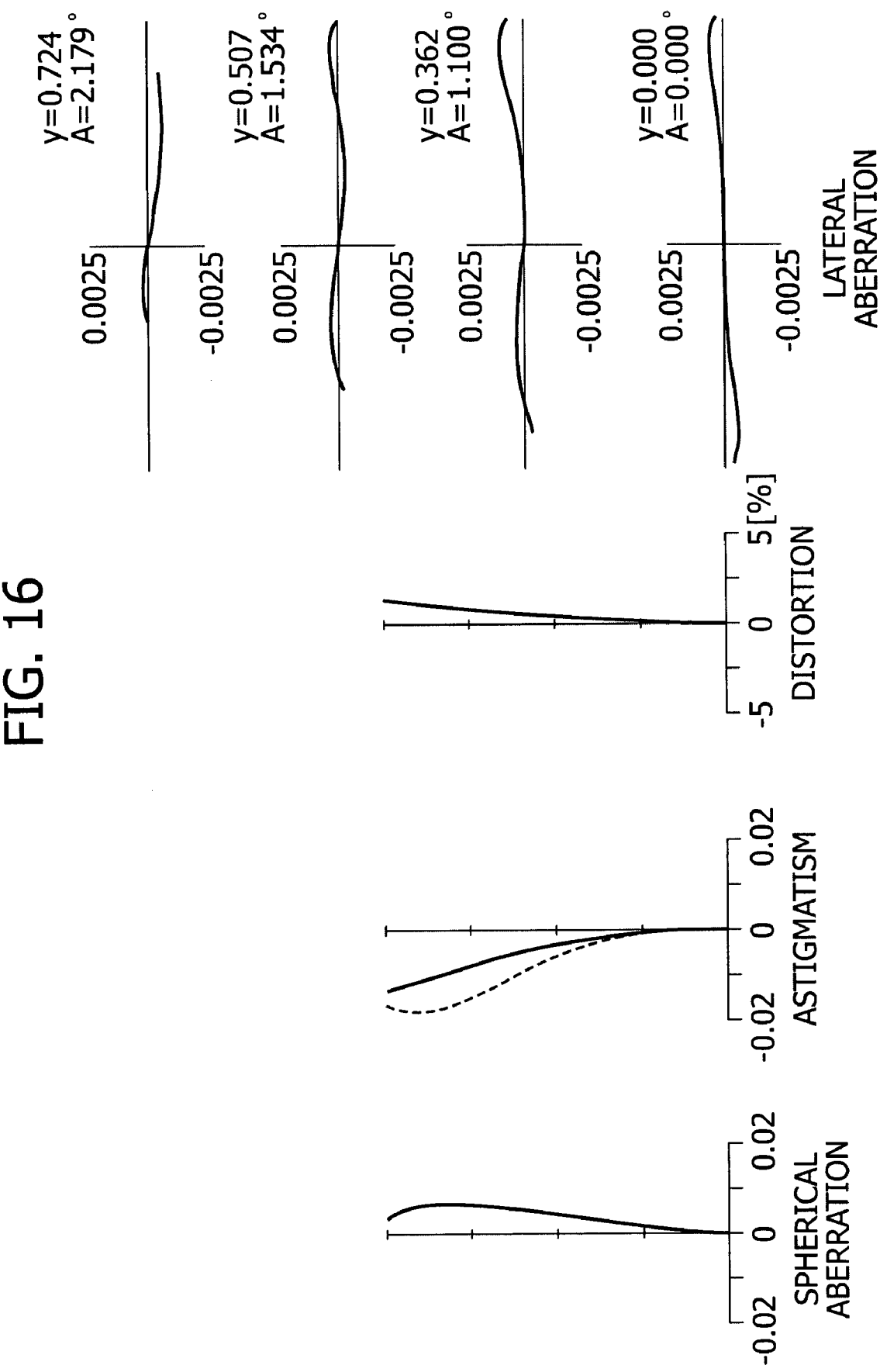
FIG. 16 shows graphs of a spherical aberration, an astigmatism, a distortion, and lateral aberrations measured during the maximum telephoto state.

Each of FIGS. 13 to 16 shows various aberration graphs in the third numerical example which is in focus at infinity. FIG. 13 shows various aberration graphs obtained during the maximum wide angle state (f=1.000), FIG. 14 shows various aberration graphs obtained during the first intermediate focal length state (f=2.614), FIG. 15 shows various aberration graphs obtained during the second intermediate focal length state (f=7.091), and FIG. 16 shows various aberration graphs obtained during the maximum telephoto state (f=18.778).

In the aberration graphs in each of FIGS. 13 to 16, a solid line in a spherical aberration graph represents a spherical aberration, a solid line and a dashed line in an astigmatism graph represent a sagittal image plane and a meridional image plane, respectively. In a lateral aberration graph, A represents an angle of view and y represents an image height.

The respective aberration graphs clearly demonstrate that the third numerical example has the aberrations satisfactorily corrected and thus has superior image-forming performance.

Figure 17:
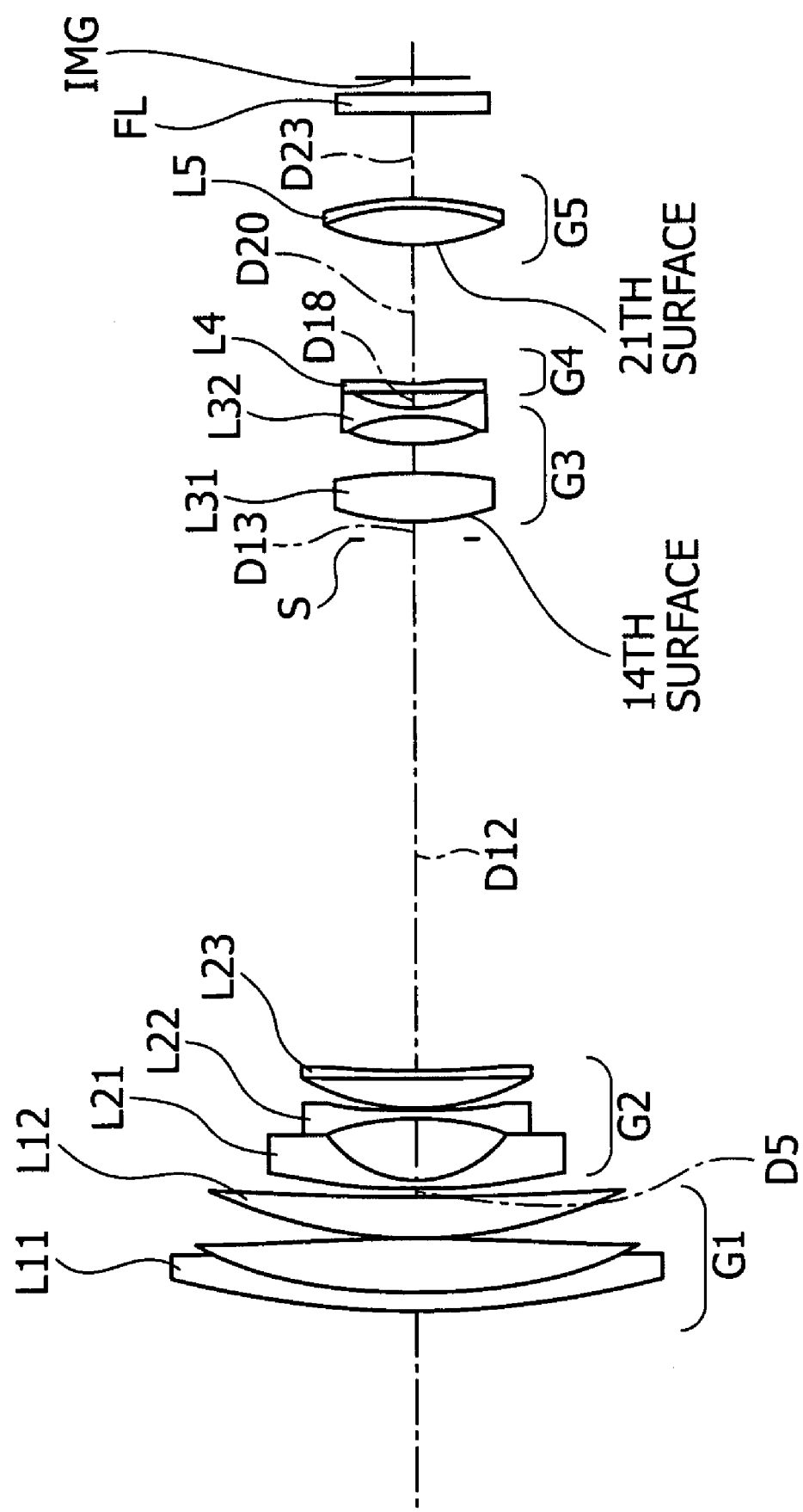
FIG. 17 is a diagram showing the lens construction of a zoom lens according to a fourth embodiment of the present invention.

FIG. 17 is a diagram showing the lens construction of a zoom lens 4 according to a fourth embodiment of the present invention. A first lens group G1 is constructed by positioning, in the order from the object side to the image-plane side, a cemented lens L11 formed of a meniscus-shaped negative lens having a convex surface facing the object side and a positive lens having a convex surface facing the object side, and a positive lens L12 having a convex surface facing the object side. A second lens group G2 is constructed by positioning, in the order from the object side to the image-plane side, a meniscus-shaped negative lens L21 having a concave surface facing the image side, a biconcave negative lens L22, and a cemented lens L23 formed of a biconvex positive lens and a biconcave negative lens. A third lens group G3 is constructed by positioning, in the order from the object side to the image-plane side, a biconvex positive lens L31 having a convex surface facing the object side and having the object-side surface formed of an aspherical surface, and a cemented negative lens L32 formed of a positive lens having a convex surface facing the object side and a negative lens having a concave surface facing the image side. A fourth lens group G4 is constructed of a biconcave negative lens L4. A fifth lens group G5 is constructed of a cemented positive lens L5 formed by positioning, in the order from the object side to the image-plane side, a biconvex positive lens having an object-side surface formed of an aspherical surface, and a meniscus-shaped negative lens having a concave surface facing the object side.

An aperture stop S is disposed on the object side of the third lens group G3, and moves along a locus independent of the third lens group G3 during the change of the lens zoom position.

Furthermore, a filter FL such as a low-pass filter is disposed between the fifth lens group G5 and an image plane IMG.

Table 13 shows the lens data of a fourth numerical example in which specific values are applied to the zoom lens 4.

TABLE 13

| SUR-FACE NUMBER | CURVA-TURE RADIUS | SURFACE DISTANCE | REFRAC-TIVE INDEX | ABBE NUM-BER | |
|---|---|---|---|---|---|
| 1: | 15.145 | 0.261 | 1.90366 | 31.1 | |
| 2: | 8.220 | 0.851 | 1.49700 | 81.6 | |
| 3: | −65.476 | 0.037 | | | |
| 4: | 7.563 | 0.627 | 1.60300 | 65.5 | |
| 5: | 31.906 | (D5) | | | |
| 6: | 9.199 | 0.136 | 1.88300 | 40.8 | |
| 7: | 1.685 | 0.966 | | | |
| 8: | −5.340 | 0.112 | 1.75500 | 52.3 | |
| 9: | 6.732 | 0.054 | | | |
| 10: | 3.565 | 0.494 | 1.92286 | 20.8 | |
| 11: | −230.842 | 0.112 | 1.77250 | 49.6 | |
| 12: | 12.373 | (D12) | | | |
| 13: | 0.000 | (D13) | | | (APER-TURE STOP) |
| 14: | 3.048 | 0.746 | 1.61800 | 63.4 | |
| 15: | −6.125 | 0.493 | | | |
| 16: | 2.921 | 0.424 | 1.61800 | 63.4 | |
| 17: | −2.051 | 0.112 | 1.59551 | 39.2 | |
| 18: | 1.735 | (D18) | | | |
| 19: | −836.036 | 0.112 | 1.69680 | 55.3 | |
| 20: | 6.196 | (D20) | | | |
| 21: | 2.786 | 0.616 | 1.58913 | 61.3 | |
| 22: | −3.951 | 0.103 | 1.92286 | 20.8 | |
| 23: | −5.749 | (D23) | | | |
| 24: | 0.000 | 0.267 | 1.51680 | 64.2 | |
| 25: | 0.000 | (Bf) | | | |

In the zoom lens 4, the object-side surface (the 14th surface) of the biconvex lens L31 of the third lens group G3 and the object-side surface (the 21st surface) of the cemented positive lens L5 of the fifth lens group G5 are formed of aspherical surfaces. The 4th-, 6th-, 8th-, and 10th-order aspherical coefficients A, B, C, and D of these surfaces in the fourth numerical example are shown in Table 14 along with cone constants "κ".

TABLE 14

| 14TH SURFACE | κ = 2.0000 | A = −0.183439E−01<br>D = −0.221056E−03 | B = −0.287054E−02 | C = −0.113602E−03 |
| --- | --- | --- | --- | --- |
| 21ST SURFACE | κ = −4.5634 | A = +0.177025E−01<br>D = +0.118958E−02 | B = −0.535615E−03 | C = −0.283188E−02 |

In the zoom lens 4, the surface distance D5 between the first lens group G1 and the second lens group G2, the surface distance D12 between the second lens group G2 and the aperture stop S, the surface distance D13 between the aperture stop S and the third lens group G3, the surface distance D18 between the third lens group G3 and the fourth lens group G4, the surface distance D20 between the fourth lens group G4 and the fifth lens group G5, and the surface distance D23 between the fifth lens group G5 and the filter FL vary during zooming from the maximum wide angle state to the maximum telephoto state. The values of the respective distances in the fourth numerical example during its wide-angle end (f=1.000), its first intermediate focal length (f=4.624), its second intermediate focal length (f=10.820), and its telephoto end (f=22.530) are shown in Table 15 along with focal lengths "f", maximum aperture F-numbers "FNO", and angles of view "2ω".

TABLE 15

| f | 1.000 | 4.624 | 10.820 | 22.530 |
| --- | --- | --- | --- | --- |
| FNO | 2.87 | 3.52 | 3.44 | 4.42 |
| 2ω | 74.20 | 17.57 | 7.62 | 3.59° |
| D5 | 0.140 | 5.241 | 7.600 | 8.731 |
| D12 | 8.417 | 2.614 | 0.386 | 0.373 |
| D13 | 0.299 | 0.028 | 0.900 | 0.514 |
| D18 | 0.287 | 2.218 | 2.990 | 3.376 |
| D20 | 2.191 | 1.033 | 0.832 | 2.314 |
| D23 | 1.395 | 2.553 | 2.754 | 1.272 |
| Bf | 0.225 | 0.225 | 0.225 | 0.225 |

The values corresponding to the respective conditional expressions (1) through (10) of the fourth numerical example are shown in Table 16.

TABLE 16 f2 = −2.001
f4 = −8.826
β5t = 0.448
β2w = −0.206
β2t = −1.809
f1 = 12.703
f1a = 55.302
  (1) f2/f4 = 0.227
  (2) Δ3/ft = 0.136
  (3) D4/TL = 0.205
  (4) β5t = 0.448
  (5) β2w · β2t = 0.373
  (6) |f4|/ft = 0.390
  (7) f1/f1a = 0.230
  (8) vd1P = 81.6
  (9) n2a = 1.755
  (10) (r2d + r3e)/fw = 10.285

Figure 18:
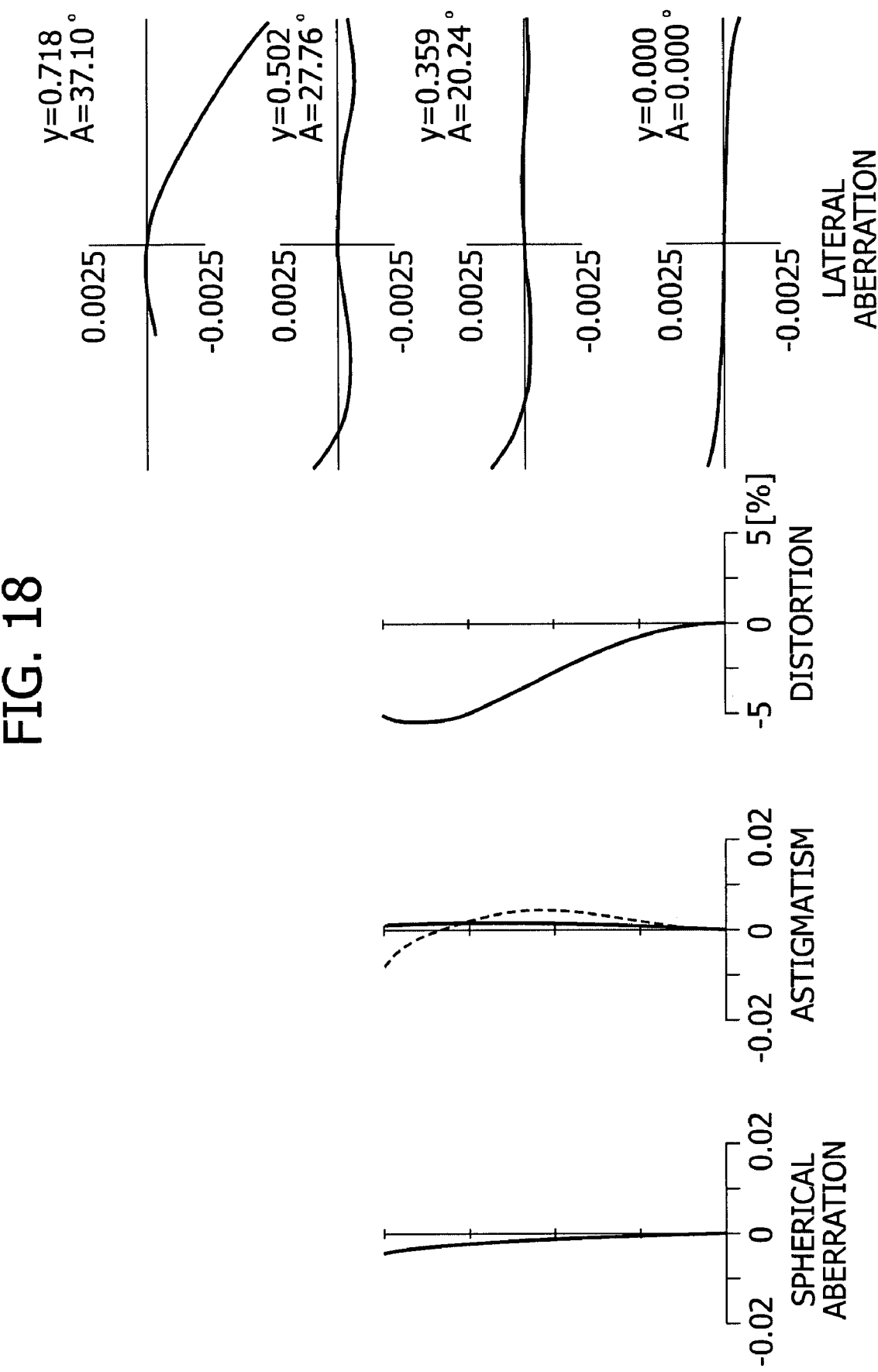
FIG. 18 shows graphs, along with FIGS. 19 to 21, of aberrations of a fourth numerical example obtained by applying specific values to the fourth embodiment, FIG. 18 showing a spherical aberration, an astigmatism, a distortion, and lateral aberrations measured during the maximum wide angle state.
Figure 19:
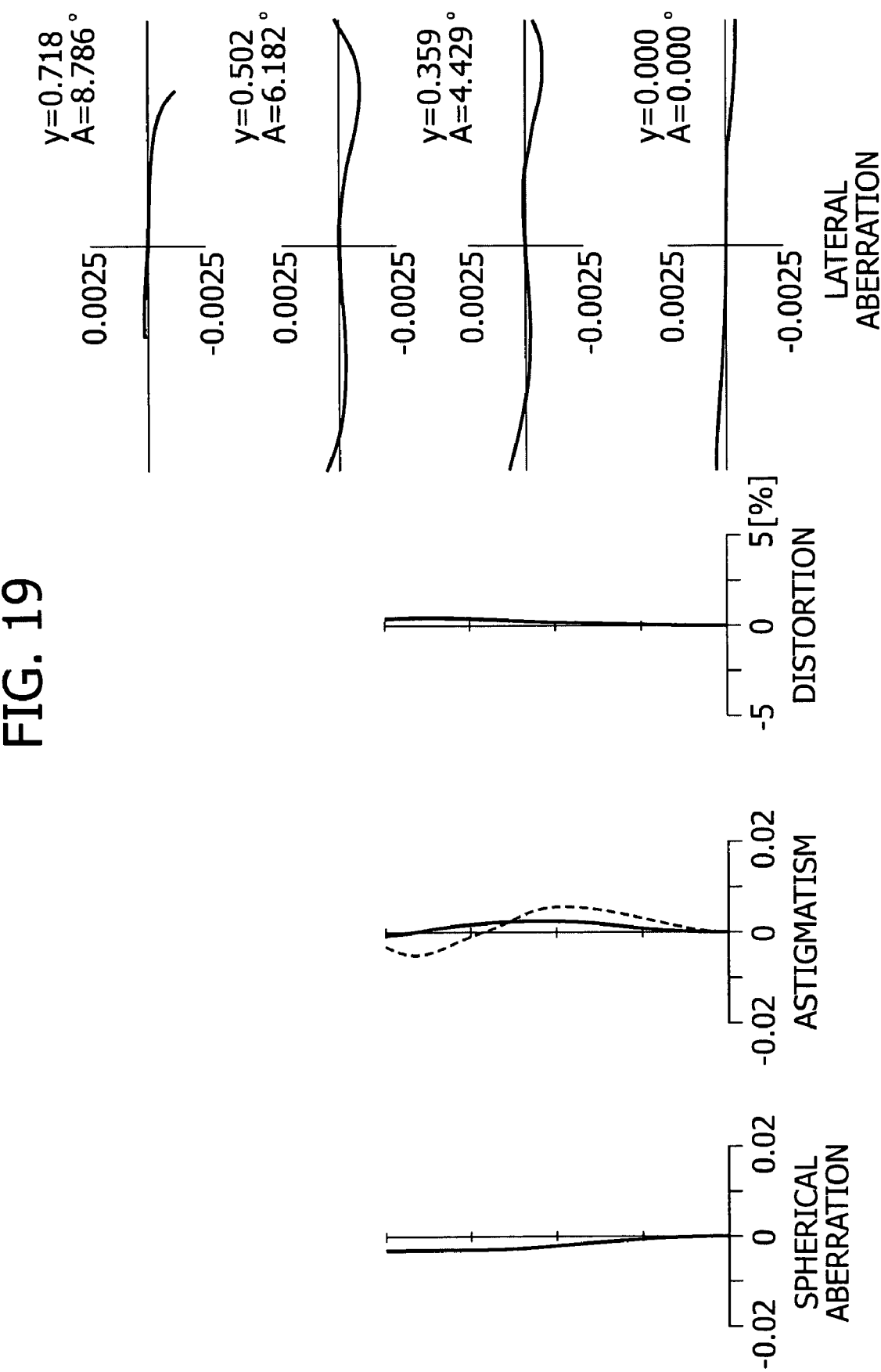
FIG. 19 shows graphs of a spherical aberration, an astigmatism, a distortion, and lateral aberrations measured during the first intermediate focal length state.
Figure 20:
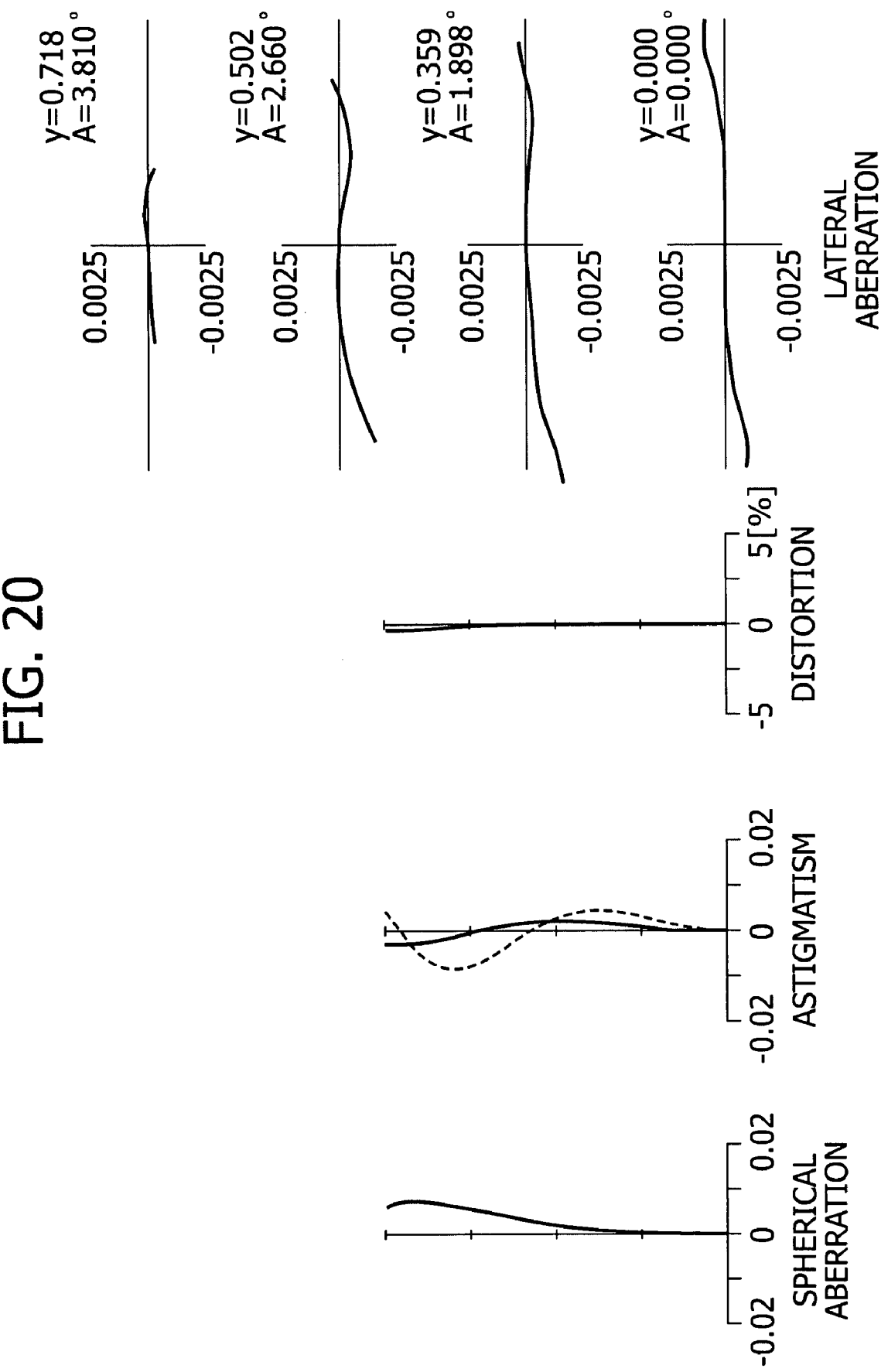
FIG. 20 shows graphs of a spherical aberration, an astigmatism, a distortion, and lateral aberrations measured during the second intermediate focal length state.
Figure 21:
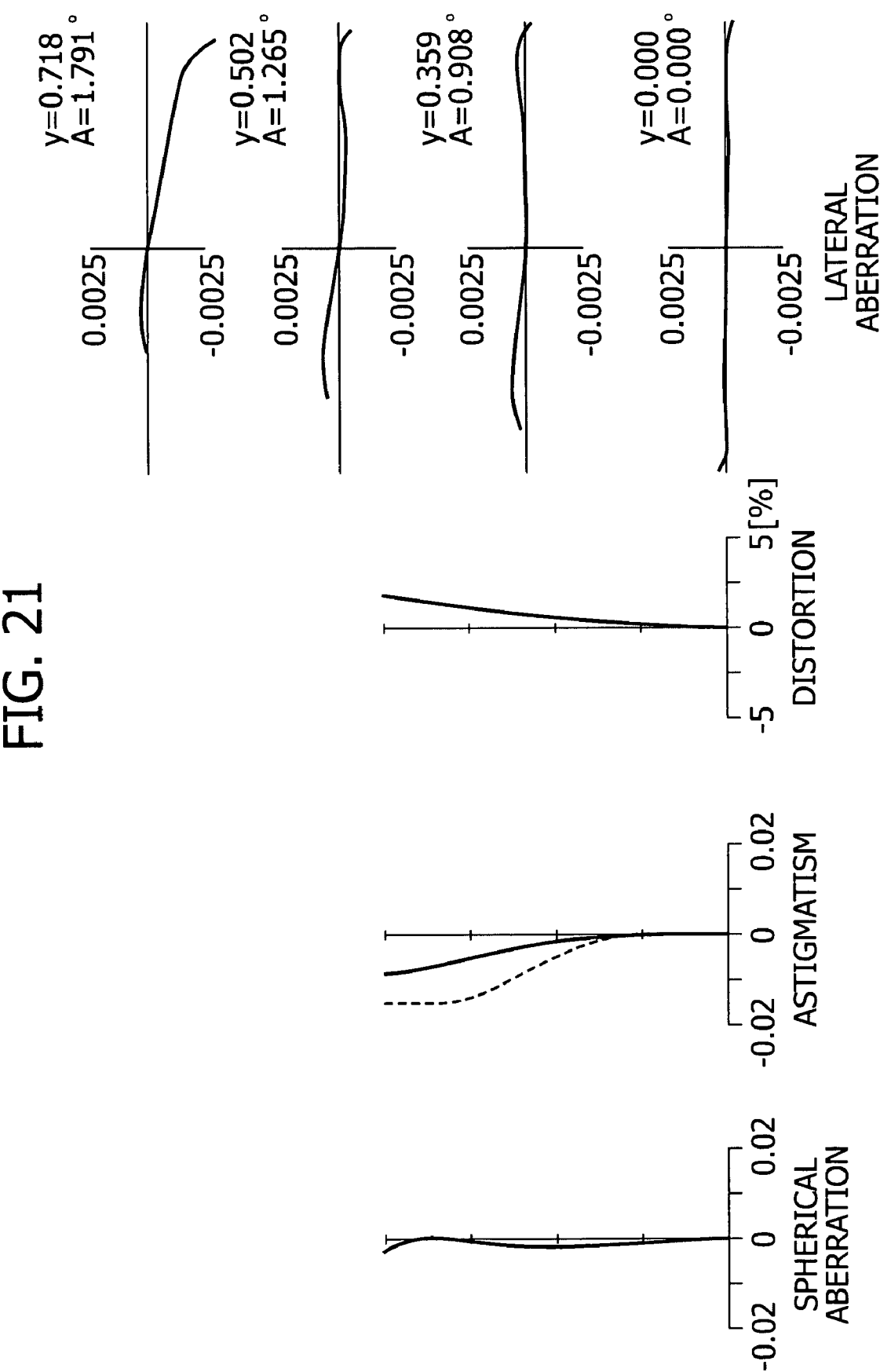
FIG. 21 shows graphs of a spherical aberration, an astigmatism, a distortion, and lateral aberrations measured during the maximum telephoto state.

Each of FIGS. 18 to 21 shows various aberration graphs in the fourth numerical example which is in focus at infinity. FIG. 18 shows various aberration graphs obtained during the maximum wide angle state (f=1.000), FIG. 19 shows various aberration graphs obtained during the first intermediate focal length state (f=4.624), FIG. 20 shows various aberration graphs obtained during the second intermediate focal length state (f=10.820), and FIG. 21 shows various aberration graphs obtained during the maximum telephoto state (f=22.530).

In the aberration graphs in each of FIGS. 18 to 21, a solid line in a spherical aberration graph represents a spherical aberration, a solid line and a dashed line in an astigmatism graph represent a sagittal image plane and a meridional image plane, respectively. In a lateral aberration graph, A represents an angle of view and y represents an image height.

The respective aberration graphs clearly demonstrate that the fourth numerical example has its aberrations satisfactorily corrected and thus has superior image-forming performance.

Figure 22:
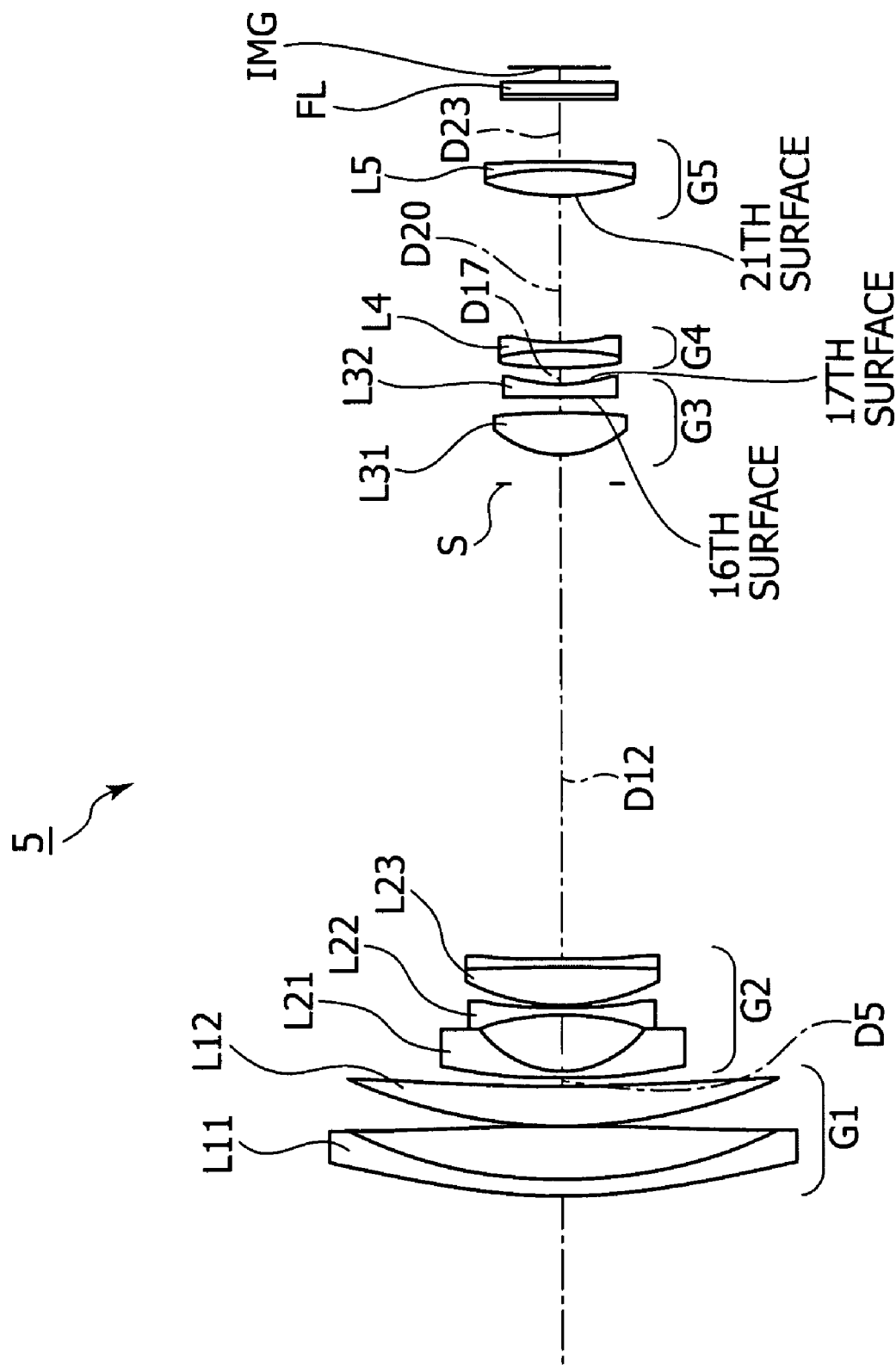
FIG. 22 is a diagram showing the lens construction of a zoom lens according to a fifth embodiment of the present invention.

FIG. 22 is a diagram showing the lens construction of a zoom lens 5 according to a fifth embodiment of the present invention. A first lens group G1 is constructed by positioning, in the order from the object side to the image-plane side, a cemented lens L11 formed of a meniscus-shaped negative lens having a convex surface facing the object side and a positive lens having a convex surface facing the object side, and a positive lens L12 having a convex surface facing the object side. A second lens group G2 is constructed by positioning, in the order from the object side to the image-plane side, a meniscus-shaped negative lens L21 having a concave surface facing the image side, a biconcave negative lens L22, and a cemented lens L23 formed of a biconvex positive lens and a biconcave negative lens. A third lens group G3 is constructed by positioning, in the order from the object side to the image-plane side, a biconvex positive lens L31 having a convex surface facing the object side, and a meniscus-shaped negative lens L32 having a concave surface facing the image side and having both surfaces formed of aspherical surfaces. A fourth lens group G4 is constructed of a cemented negative lens L4 formed by positioning, in the order from the object side to the image-plane side, a biconvex positive lens and a biconcave negative lens. A fifth lens group G5 is constructed of a cemented positive lens L5 formed by positioning, in the order from the object side to the image-plane side, a biconvex positive lens having an object-side surface formed of an aspherical surface, and a meniscus-shaped negative lens having a concave surface facing the object side.

An aperture stop S is disposed on the object side of the third lens group G3, and moves integrally with the third lens group G3 during the change of the lens zoom position.

Furthermore, a filter FL such as a low-pass filter is disposed between the fifth lens group G5 and an image plane IMG.

Table 17 shows the lens data of a fifth numerical example in which specific values are applied to the zoom lens 5.

TABLE 17

| SURFACE NUMBER | CURVATURE RADIUS | SURFACE DISTANCE | REFRACTIVE INDEX | ABBE NUMBER |
| --- | --- | --- | --- | --- |
| 1: | 12.358 | 0.261 | 1.90366 | 31.1 |
| 2: | 8.010 | 0.871 | 1.49700 | 81.6 |
| 3: | −95.889 | 0.037 | | |

TABLE 17-continued

| SURFACE NUMBER | CURVATURE RADIUS | SURFACE DISTANCE | REFRACTIVE INDEX | ABBE NUMBER | |
|---|---|---|---|---|---|
| 4: | 7.745 | 0.667 | 1.49700 | 81.6 | |
| 5: | 30.201 | (D5) | | | |
| 6: | 9.103 | 0.131 | 1.88300 | 40.8 | |
| 7: | 1.632 | 0.928 | | | |
| 8: | −5.585 | 0.112 | 1.83400 | 37.4 | |
| 9: | 6.360 | 0.060 | | | |
| 10: | 3.545 | 0.653 | 1.92286 | 20.8 | |
| 11: | −20.985 | 0.112 | 1.72000 | 50.3 | |
| 12: | 15.842 | (D12) | | | |
| 13: | 0.000 | 0.485 | | | (APERTURE STOP) |
| 14: | 1.561 | 0.653 | 1.49700 | 81.6 | |
| 15: | −8.973 | 0.296 | | | |
| 16: | 8.067 | 0.186 | 1.68893 | 31.1 | |
| 17: | 2.797 | (D17) | | | |
| 18: | 5.593 | 0.284 | 1.48749 | 70.4 | |
| 19: | −3.185 | 0.112 | 1.51742 | 52.4 | |
| 20: | 3.325 | (D20) | | | |
| 21: | 3.552 | 0.430 | 1.88300 | 40.8 | |
| 22: | −4.402 | 0.103 | 1.92286 | 20.8 | |
| 23: | −78.128 | (D23) | | | |
| 24: | 0.000 | 0.267 | 1.51680 | 64.2 | |
| 25: | 0.000 | (Bf) | | | |

In the zoom lens 5, both surfaces (the 16th and the 17th surfaces) of the meniscus-shaped negative lens L32 of the third lens group G3 and the object-side surface (the 21st surface) of the cemented positive lens L5 of the fifth lens group G5 are formed of aspherical surfaces. The 4th-, 6th-, 8th-, and 10th-order aspherical coefficients A, B, C, and D of these surfaces in the fifth numerical example are shown in Table 18 along with cone constants "κ".

TABLE 18

| 16TH SURFACE | κ = 0.0000 | A = −0.334259E−01<br>D = +0.000000E+00 | B = +0.000000E+00 | C = +0.000000E+00 |
| 17TH SURFACE | κ = 0.1078 | A = +0.184724E−01<br>D = +0.117476E−01 | B = +0.212785E−01 | C = +0.103078E−01 |
| 21ST SURFACE | κ = 0.0000 | A = −0.192126E−02<br>D = +0.170572E−02 | B = +0.426335E−02 | C = −0.445547E−02 |

In the zoom lens 5, the surface distance D5 between the first lens group G1 and the second lens group G2, the surface distance D12 between the second lens group G2 and the aperture stop S, the surface distance D17 between the third lens group G3 and the fourth lens group G4, the surface distance D20 between the fifth lens group G4 and the fifth lens group G5, and the surface distance D23 between the fifth lens group G5 and the filter FL vary during zooming from the maximum wide angle state to the maximum telephoto state. The values of the respective distances in the fifth numerical example during its wide-angle end (f=1.000), the first intermediate focal length (f=5.036), the second intermediate focal length (f=10.816), and the telephoto end (f=22.521) are shown in Table 19 along with focal lengths "f", maximum aperture F-numbers "FNO", and angles of view "2ω".

TABLE 19

| f | 1.000 | 5.036 | 10.816 | 22.521 |
|---|---|---|---|---|
| FNO | 2.88 | 3.26 | 3.46 | 4.40 |
| 2ω | 74.18 | 16.13 | 7.60 | 3.49° |

TABLE 19-continued

| f | 1.000 | 5.036 | 10.816 | 22.521 |
|---|---|---|---|---|
| D5 | 0.140 | 5.904 | 7.993 | 9.144 |
| D12 | 7.982 | 1.856 | 0.690 | 0.298 |
| D17 | 0.299 | 2.256 | 3.039 | 3.430 |
| D20 | 2.474 | 1.144 | 0.979 | 2.460 |
| D23 | 1.087 | 2.417 | 2.582 | 1.101 |
| Bf | 0.223 | 0.222 | 0.222 | 0.222 |

The values corresponding to the respective conditional expressions (1) through (10) of the fifth numerical example are shown in Table 20.

TABLE 20

| |
|---|
| $f2 = -1.959$ |
| $f4 = -13.475$ |
| $\beta5t = 0.552$ |
| $\beta2w = -0.192$ |
| $\beta2t = -1.666$ |
| $f1 = 13.308$ |
| $f1a = 35.809$ |
| (1) $f2/f4 = 0.145$ |
| (2) $\Delta3/ft = 0.140$ |
| (3) $D4/TL = 0.197$ |
| (4) $\beta5t = 0.552$ |
| (5) $\beta2w \cdot \beta2t = 0.320$ |
| (6) $|f4|/ft = 0.599$ |
| (7) $f1/f1a = 0.372$ |
| (8) $vd1P = 81.6$ |
| (9) $n2a = 1.834$ |
| (10) $(r2d + r3e)/fw = 9.908$ |

Figure 23:
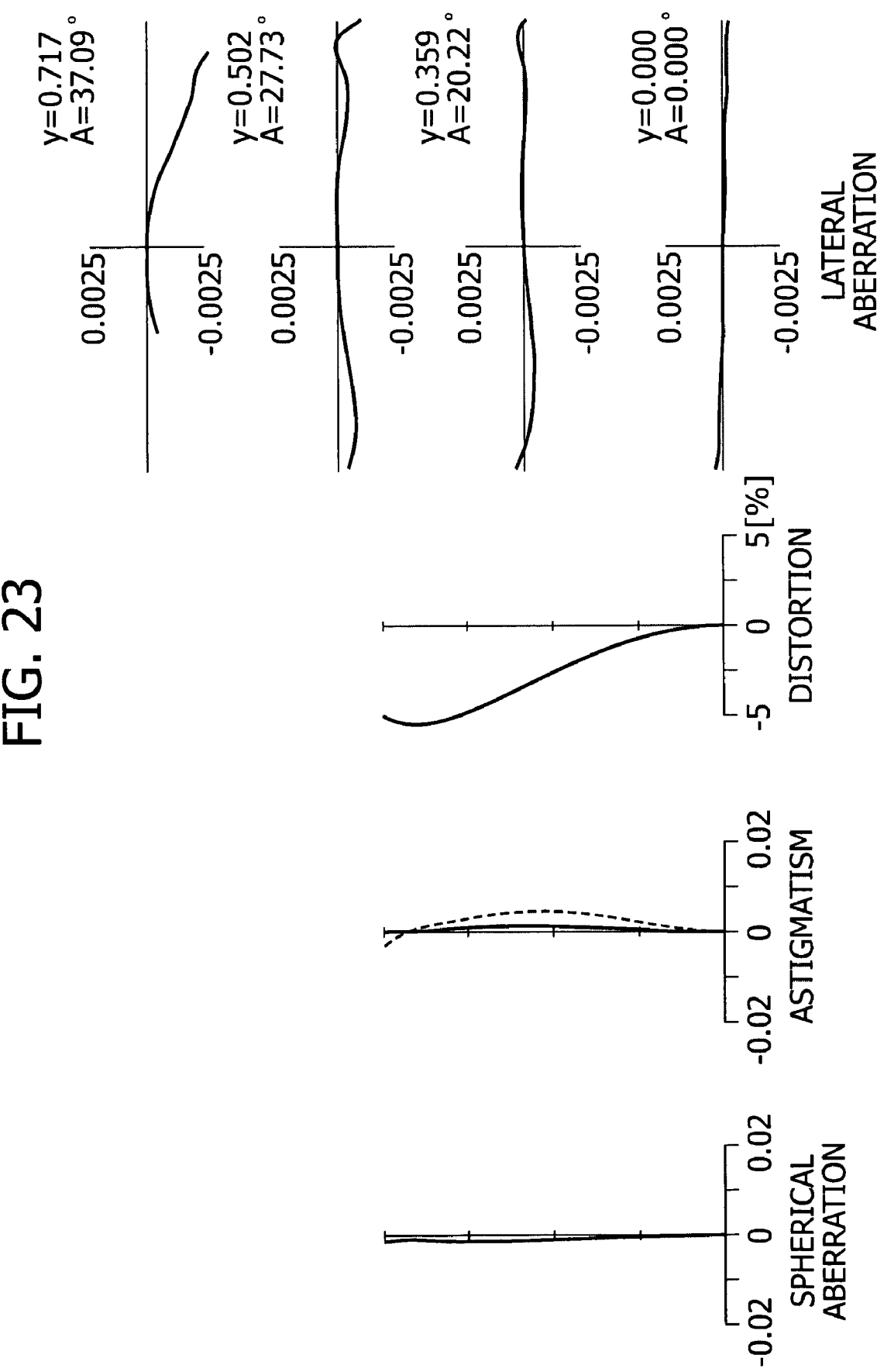
FIG. 23 shows graphs, along with FIGS. 24 to 26, of aberrations of a fifth numerical example obtained by applying specific values to the fifth embodiment, FIG. 23 showing a spherical aberration, an astigmatism, a distortion, and lateral aberrations measured during the maximum wide angle state.
Figure 24:
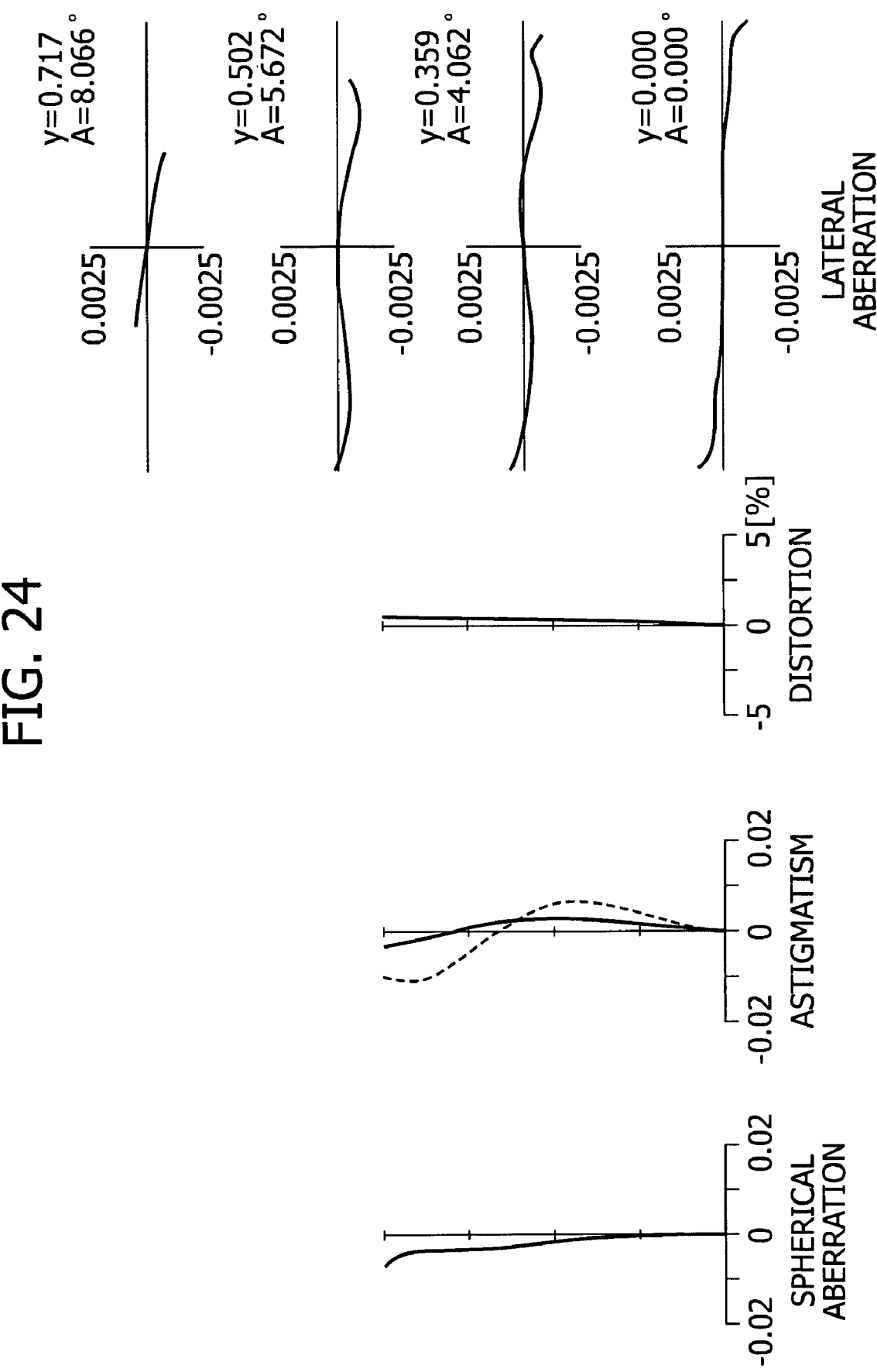
FIG. 24 shows graphs of a spherical aberration, an astigmatism, a distortion, and lateral aberrations measured during the first intermediate focal length state.
Figure 25:
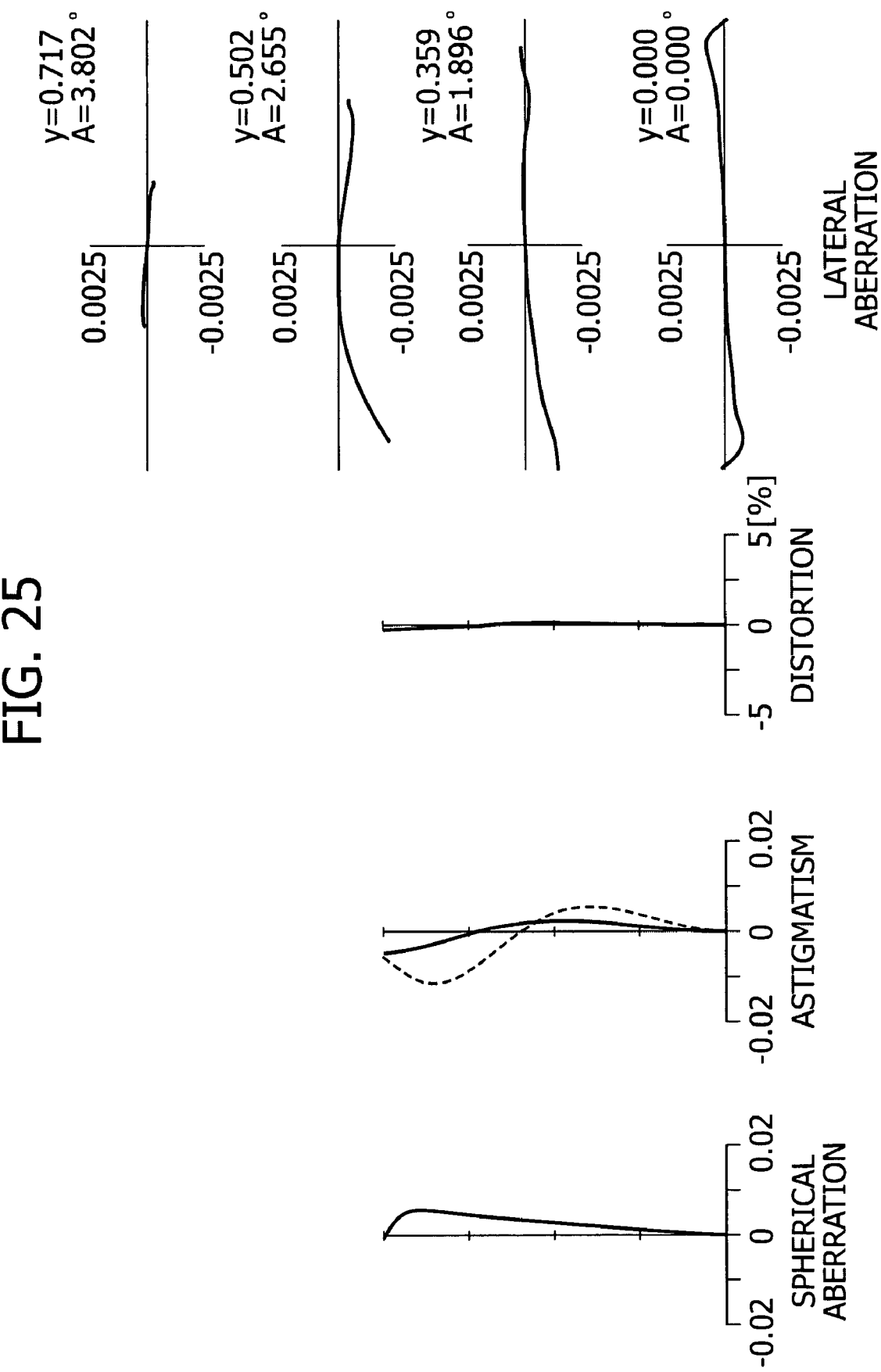
FIG. 25 shows graphs of a spherical aberration, an astigmatism, a distortion, and lateral aberrations measured during the second intermediate focal length state.
Figure 26:
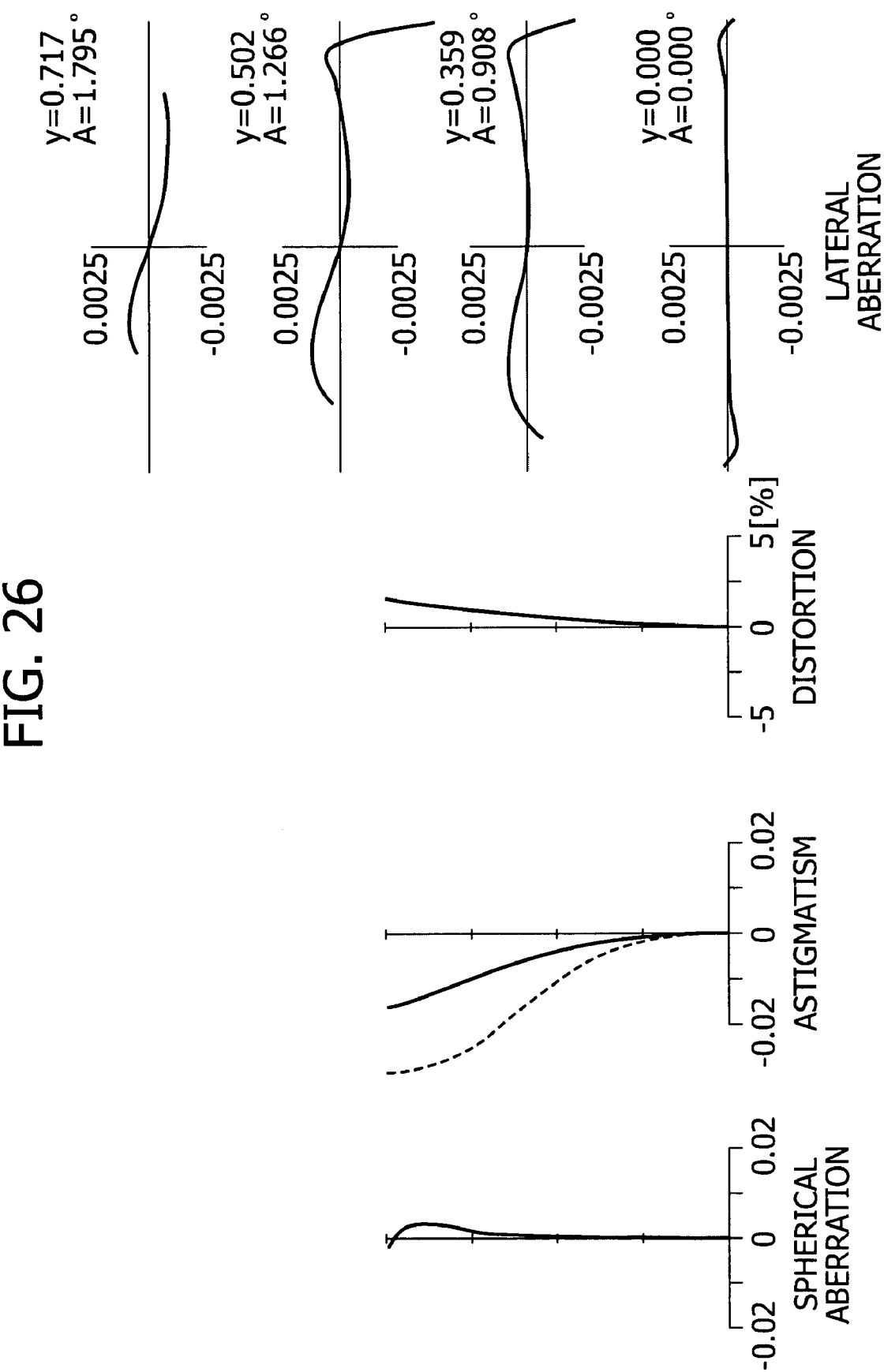
FIG. 26 shows graphs of a spherical aberration, an astigmatism, a distortion, and lateral aberrations measured during the maximum telephoto state.

Each of FIGS. 23 to 26 shows various aberration graphs in the fifth numerical example which is in focus at infinity. FIG. 23 shows various aberration graphs obtained during the maximum wide angle state (f=1.000), FIG. 24 shows various aberration graphs obtained during the first intermediate focal length state (f=5.036), FIG. 25 shows various aberration graphs obtained during the second intermediate focal length state (f=10.816), and FIG. 26 shows various aberration graphs obtained during the maximum telephoto state (f=22.521).

In the aberration graphs in each of FIGS. 23 to 26, a solid line in a spherical aberration graph represents a spherical aberration, a solid line and a dashed line in an astigmatism graph represent a sagittal image plane and a meridional image plane, respectively. In a lateral aberration graph, A represents an angle of view and y represents an image height.

The respective aberration graphs clearly demonstrate that the fifth numerical example has its aberrations satisfactorily corrected and thus has superior image-forming performance.

Next, an imaging apparatus according to an embodiment of the present invention will be described.

The imaging apparatus according to an embodiment of the present invention includes a zoom lens and an imaging device for converting an optical image formed by the zoom lens into an electrical signal. The zoom lens includes, in the order from the object side to the image-plane side, a first lens group having a positive refractive power, a second lens group having a negative refractive power, a third lens group having a positive refractive power, a fourth lens group having a negative refractive power, and a fifth lens group having a positive refractive power. During the change of the lens zoom position from the maximum wide angle state to the maximum telephoto state, at least the second lens group moves toward the image side, the third lens group moves toward the object side, and the fourth lens group is fixed in the optical-axis direction. An aperture stop is disposed near the object side of the third lens group. The following conditional expressions (1) and (2) are satisfied:

$$0.05 < f2/f4 < 0.3, \text{ and} \qquad (1)$$

$$0.1 < \Delta 3/ft < 0.2, \qquad (2)$$

where f2 is the focal length of the second lens group, f4 is the focal length of the fourth lens group, Δ3 is the amount of movement of the third lens group during the change of the lens zoom position from the maximum wide angle state to the maximum telephoto state, and ft is the focal length of the whole lens system at the maximum telephoto state.

Accordingly, in the imaging apparatus according to an embodiment of the present invention, a high zooming ratio exceeding 20 times, higher performance, and miniaturization may all be achieved.

Next, one specific embodiment of the imaging apparatus will be described. In this embodiment, the imaging apparatus is applied to a digital still camera. A configuration example of the digital still camera is shown in FIG. 27 in a block diagram.

A digital still camera 100 includes a lens block 10 for performing an image capture function, a camera signal processing section 20 for performing signal processing such as analog-to-digital conversion of a captured image signal, an image processing section 30 for performing recording/playback of the image signal, an LCD (Liquid Crystal Display) 40 for displaying the captured image and the like, a reader/writer (R/W) for performing reading/writing from/to a memory card 51, a CPU (Central Processing Unit) 60 for controlling the whole apparatus, an input section 70 for input of control by a user, and a lens drive control section 80 for controlling the driving of lenses within the lens block 10.

The lens block 10 is provided with an optical system including a zoom lens 1 according to an embodiment of the present invention, an imaging device 12 such as a CCD. The camera signal processing section 20 performs image processing such as conversion on an output signal from the imaging device 12 into a digital signal, noise removal, image quality correction, conversion into luminance/color difference signals, and the like. The image processing section 30 performs compression encoding/decompression decoding processing on the image signal based on a predetermined image data format, conversion processing for data specification such as resolution, and the like. The zoom lenses 1 to 5 and the numerical examples 1 to 5 according to embodiments of the present invention may be used as the zoom lens 1. Furthermore, any other zoom lens into which the present invention is embodied in modes other than the above-described embodiments and numerical examples may also be used.

The memory card 51 includes a detachable/attachable semiconductor memory. The reader/writer 50 writes image data encoded by the image processing section 30 to the memory card 51, or reads image data recorded on the memory card 51. The CPU 60 is a control processing section for controlling various circuit blocks within the digital still camera, and controls the various circuit blocks in response to an instruction input signal or the like from the input section 70.

The input section 70 includes, e.g., a shutter release button for performing shutter operation, and mode selection switches for selecting operation modes, and the like, and outputs an instruction input signal responsive to user control, to the CPU 60. The lens drive control section 80 controls motors (not shown) and the like, driving the lenses within the zoom lens 1 in response to a control signal from the CPU 60.

An operation of this digital still camera will briefly be described below.

During standby for image taking, under control by the CPU 60, an image signal captured in the lens block 10 is outputted to the LCD 40 via the camera signal processing section 20, for display as a camera-through image. Also, when an instruction input signal for zooming from the input section 70 is received, the CPU 60 outputs a control signal to the lens drive control section 80, and predetermined lenses within the zoom lens 1 are moved on the basis of control by the lens drive control section 80.

Then, when a shutter(not shown) of the lens block 10 is released by an instruction input signal from the input section 70, the captured image signal is outputted from the camera signal processing section 20 to the image processing section 30, and subjected to compression encoding processing and converted into digital data of a predetermined data format. The converted data is outputted to the reader/writer 50, and written to the memory card 51.

The focusing is performed by the lens drive control section 80 causing predetermined lenses within the zoom lens 1 to move on the basis of a control signal from the CPU 60, e.g., when a shutter release button is pressed halfway down, all the way down for recording, or the like.

Furthermore, to play back image data recorded on the memory card 51, the reader/writer 50 reads predetermined image data from the memory card 51 responsive to control by the input section 70. After the image data is subjected to decompression decoding processing in the image processing section 30, a playback image signal is outputted to the LCD 40. As a result, the played back image is displayed.

While a case where the imaging apparatus according to an embodiment of the present invention is applied to a digital still camera has been described in the above embodiment, it may also be applied to other imaging apparatus such as video cameras, and the like.

Furthermore, the shapes and structures of the respective sections as well as the numerical values that have been referred to in the above description of the embodiments and the numerical examples are provided merely as one example for illustrative purposes for ease of understanding of various embodiments for carrying out the present invention, and these embodiments are not to be construed as limiting the technical scope of the present invention.

What is claimed is:

1. A zoom lens comprising, in order from an object side to an image-plane side:
    a first lens group having a positive refractive power;
    a second lens group having a negative refractive power;
    a third lens group having a positive refractive power;
    a fourth lens group having a negative refractive power; and
    a fifth lens group having a positive refractive power,
    wherein, during a change of a lens zoom position from a maximum wide angle state to a maximum telephoto state, at least the second lens group moves toward an image side, the third lens group moves toward an object side, and the fourth lens group is fixed in an optical-axis direction, an aperture stop is disposed near the object side of the third lens group, and the following conditional expressions (1) and (2) are satisfied:

$$0.05 < f2/f4 < 0.3, \text{ and} \quad (1)$$

$$0.1 < \Delta 3/ft < 0.2, \quad (2)$$

where f2 is a focal length of the second lens group,
f4 is a focal length of the fourth lens group,
$\Delta 3$ is an amount of movement of the third lens group during the change of the lens zoom position from the maximum wide angle state to the maximum telephoto state, and
ft is a focal length of a whole lens system at the maximum telephoto state.

2. The zoom lens according to claim 1, wherein the following conditional expression (3) is satisfied:

$$0.15 < D4/TL < 0.3, \quad (3)$$

where D4 is a distance from a most-imagewise surface of the fourth lens group to an image-plane, and TL is a total lens length at the maximum telephoto state.

3. The zoom lens according to claim 1, wherein:
the fifth lens group moves in the optical-axis direction during close-distance focusing, and
the following conditional expression (4) is satisfied:

$$-0.1 < \beta 5t < 0.6, \quad (4)$$

where $\beta 5t$ is a lateral magnification of the fifth lens group at the maximum telephoto state.

4. The zoom lens according to claim 3, wherein the following conditional expression (5) is satisfied:

$$0.25 < \beta 2w \cdot \beta 2t < 0.8, \quad (5)$$

where $\beta 2w$ is a lateral magnification of the second lens group at the maximum wide angle state, and $\beta 2t$ is a lateral magnification of the second lens group at the maximum telephoto state.

5. The zoom lens according to claim 4, wherein the conditional expression (6) is satisfied:

$$0.3 < |f4|/ft < 1.5. \quad (6)$$

6. The zoom lens according to claim 1, wherein:
the first lens group is constructed of a cemented lens component formed of a meniscus-shaped negative lens having a concave surface facing the image side and a positive lens having a convex surface facing the object side, and a single or a plurality of positive lens components disposed on the image side of the cemented lens, and
the following conditional expressions (7) and (8) are satisfied:

$$-0.15 < f1/f1a < 0.4, \text{ and} \quad (7)$$

$$vd1P > 70, \quad (8)$$

where f1a is a focal length of the cemented lens component disposed in the first lens group, f1 is a focal length of the first lens group, and vd1P is Abbe number of the positive lens of the cemented lens component disposed in the first lens group.

7. The zoom lens according to claim 1, wherein:
the second lens group is constructed by positioning, in order from the object side to the image-plane side, a meniscus-shaped first negative lens component having a concave surface facing the image side, a biconvex second negative lens component, and a meniscus-shaped positive lens component having a convex surface facing the object side, and
the following conditional expressions (9) and (10) are satisfied:

$$1.7 < n2a, \text{ and} \quad (9)$$

$$3.5 < (r2d + r3e)/fw < 12, \quad (10)$$

where n2a is a refractive index, with respect to d-line (wavelength=587.6 nm), of the first negative lens component, r2d is a curvature radius of an image-plane-side lens surface of the second negative lens, and r2e is a curvature radius of the object-side lens surface of the positive lens component.

8. An imaging apparatus comprising:
a zoom lens; and
an imaging device for converting an optical image formed by the zoom lens into an electrical signal,
wherein the zoom lens includes, in order from an object side to an image-plane side,
a first lens group having a positive refractive power,
a second lens group having a negative refractive power,
a third lens group having a positive refractive power,
a fourth lens group having a negative refractive power, and
a fifth lens group having positive refractive power,
wherein, during a change of a lens zoom position from a maximum wide angle state to a maximum telephoto state, at least the second lens group moves toward an image side, the third lens group moves toward the object side, and the fourth lens group is fixed in an optical-axis direction,
an aperture stop is disposed near the object side of the third lens group, and
the following conditional expressions (1) and (2) are satisfied:

$$0.05 < f2/f4 < 0.3, \text{ and} \quad (1)$$

$$0.1 < \Delta 3/ft < 0.2, \quad (2)$$

where f2 is a focal length of the second lens group, f4 is a focal length of the fourth lens group, $\Delta 3$ is an amount of movement of the third lens group the change of the lens zoom position from the maximum wide angle state to the maximum telephoto state, and
ft is a focal length of a whole lens system at the maximum telephoto state.

* * * * *